United States Patent [19]

Hasegawa et al.

[11] Patent Number: 5,606,574
[45] Date of Patent: Feb. 25, 1997

[54] MOBILE UNIT IDENTIFYING SYSTEM AND METHOD OF DEMODULATING FOR THE SAME

[75] Inventors: Makoto Hasegawa; Masahiro Mimura, both of Tokyo; Hirohide Hirabayashi, Yokohama; Naoki Adachi, Kawasaki; Yasuaki Namura; Hideko Sakai, both of Yokohama, all of Japan

[73] Assignee: Matsushita Electric Industrial Co., Ltd., Japan

[21] Appl. No.: 305,513

[22] Filed: Sep. 13, 1994

[30] Foreign Application Priority Data

Sep. 13, 1993 [JP] Japan .................................. 5-226952
Jul. 8, 1994 [JP] Japan .................................. 6-157361

[51] Int. Cl.[6] .............................. H04B 7/26; G01S 13/78
[52] U.S. Cl. .............................................. 375/200; 342/42
[58] Field of Search ................................. 375/200, 367; 370/107; 342/42, 51

[56] References Cited

U.S. PATENT DOCUMENTS

| | | | |
|---|---|---|---|
| 3,981,011 | 9/1976 | Bell, III | 342/51 |
| 4,862,176 | 8/1989 | Voles | 342/45 |
| 5,055,659 | 10/1991 | Hendrick | 235/439 |
| 5,245,346 | 9/1993 | Nishimura et al. | 342/42 |
| 5,444,448 | 8/1995 | Schuermann et al. | 342/51 |

FOREIGN PATENT DOCUMENTS

| | | |
|---|---|---|
| 1-182778 | 7/1989 | Japan . |
| 2-8770 | 1/1990 | Japan . |
| 5-290226 | 11/1993 | Japan . |

*Primary Examiner*—Young T. Tse
*Attorney, Agent, or Firm*—Rossi & Associates

[57] ABSTRACT

A first mobile unit identification system having a interrogator and responder. The interrogator transmits a given magnitude of a spread spectrum coded signal in standby mode. The responder receives the spread spectrum coded signal and when the magnitude of received signal exceeds a given value, it reflects the transmitted spread spectrum coded signal with ID code when the magnitude of received signal exceeds the given value. The interrogator receives this and then, transmits data to the responder with amplitude modulating the spread spectrum coded signal with the data. The responder detects by amplitude demodulation and stores the detected data. The interrogator may transmit a mode change code. The responder may transmit an end code after transmission of a data train. A second interrogator informs the responder of the standby mode thereof by amplitude-modulated signal having a given cycle. A second responder judges whether or not the second interrogator is in standby mode by detecting the cycle and sends a communication requesting signal Q to the second responder and then, transmits ID code. In response to the signal Q, tile second interrogator transmits a signal having a fixed magnitude. A method of modulating for the mobile unit identifying system is also disclosed.

11 Claims, 24 Drawing Sheets

MOBILE UNIT IDENTIFYING SYSTEM AND METHOD OF DEMODULATING FOR THE SAME

BACKGROUND OF THE INVENTION

1. Field of the Invention

This invention relates to a mobile unit identifying system and a method of demodulating for the same.

2. Description of the Prior Art

Mobile unit identification systems are known. Such mobile unit identification systems have interrogators and responders. The interrogator identifies a responder by transmitting an interrogating signal and receiving a responding signal from the responder.

In one of such mobile unit identification systems, the interrogator transmits the interrogating signal through a microwave radio signal. A responder entering a service area of the interrogator receives the interrogating signal and effects a spectrum coding with a predetermined data. Then, the responder transmits the responding signal to the interrogator. The interrogator can recognize the responder because the interrogator has the predetermined data also and decode tile responding signal with the data.

FIG. 5 is a block diagram of such a prior art mobile unit identification system disclosed in Japanese patent application provisional publication No. 2-8770. In FIG. 5, an interrogator 401 continuously transmits an interrogating signal X obtained by modulating an oscillation signal from an oscillator 440 with predetermined data by the modulator 441 through an transmitting antenna 442. When a responder 404 enters a service area of the interrogator 401, the responder 404 detects the presence of the interrogating signal X received by a receiving antenna 443 and then, spread-spectrum-codes the interrogating signal X with an identification code stored in an identification code memory 444 provided thereto and transmits a spread-spectrum-coded interrogating signal X as a responding signal Y through a transmission antenna 446. The interrogator 401 receives the responding signal Y and demodulates the received responding signal Y with one of identification codes read from a memory table 447 provided therein and detects a reproduction condition of the demodulated response signal. When the reproduction condition is not sufficient, that is, synchronization between the interrogator and the responder is not obtained, the read identification code used in the responder 404 does not agree with the identification code read from the memory table 447. Then, the interrogator 401 reads another identification data from the memory table 447 and demodulates the received response signal. This operation is repeated until the reproduction condition of the received response signal is sufficient. When the reproduction condition is sufficient, the interrogator can identifies the responder and produces an output signal 450 obtained by demodulating the received response signal by the spread spectrum demodulator 449.

However, in the above-mentioned prior art, there is a problem that the spread spectrum modulator 445 is necessary in the responder 404 though the responder 404 is required to have a small size and a low power consumption. Moreover, in the interrogator 401, a circuit for identification between the interrogator 401 and the responder 404, so that sizes of the interrogator 401 was large.

A second prior art mobile unit identification system is disclosed in Japanese patent application provisional publication No. 1-182778.

FIG. 23 is an illustration showing a condition of the second prior art mobile unit identification system. FIG. 24. shows a timing chart of the second prior art mobile unit identification system.

The interrogator 302 transmits a communication start requesting signal R0 intermittently as show in FIG. 24. When a responder 301a enters the service area 303 of the interrogator 302, the responder 301a receives the communication start requesting signal R0 at a timing t1 as shown in FIG. 24 and generates and transmits a response signal A0 toward the interrogator 302 to start a communication with the interrogator 302. When the interrogator 302 finishes or interrupts the communication with the responder 301a, the interrogator 302 transmits a communication end requesting signal RN. When the responder 301a receives the communication end requesting signal RN at a timing ts, stops the communication operation for a predetermined interval ∆t. It is assumed that another responder 301b which has not effected a communication entered the service area 303, the responder 301b generates the response signal A0 to start a communication operation with the interrogator 302. Therefore, both responders 301a and 301b do not perform the transmission operation at the same time except that these responders 301a and 301b enter the service area 303 at the same time.

In this second prior art mobile unit identification system, the interrogator 302 and the responders 301a and 301b can perform the transmission operation separately. However, in the identification system wherein a responder transmits a modulation signal by reflecting the interrogating signal from the interrogator, this communication operation is impossible because the responder 301a transmits the response signal A0 when the interrogator transmits no signal during transmitting the response signal A0.

SUMMARY OF THE INVENTION

The present invention has been developed in order to remove the above-described drawbacks inherent to the conventional mobile unit identifying system and a method of modulating for the mobile unit identifying system.

According to the present invention there is provided a first mobile unit identifying system comprising: an interrogator having: a spread spectrum signal generation portion for generating a spread spectrum coded signal using a predetermined pseudo noise signal; a modulation portion for amplitude-modulating the spread spectrum coded signal in accordance with first data; a transmission portion for transmitting either the spread spectrum coded signal from the spread spectrum signal generator in a first mode or the spread spectrum coded signal from the modulation portion in a second mode; a receiving portion for receiving a responding signal; a demodulation portion for demodulating the responding signal including a communication request signal and data with the spread spectrum coded signal from the spread spectrum signal generation portion; a first detection portion for detecting the communication request signal from the responding signal from the demodulation portion; and a first control portion responsive to tile detected communication request signal for operating the modulation portion and transmission portion in the second mode and for operating the transmission portion in the first mode before the detection portion detects the communication request signal; and a responder having: an antenna portion for receiving the spread spectrum coded signal from the transmission portion in a third mode and for transmitting the responding signal with modulation of the spread spectrum signal from the transmission portion through reflecting and absorbing the transmitted carrier signal in a fourth mode; a second detection portion for detecting the spread spectrum coded signal from the antenna portion in the third mode; a comparing portion for detecting whether or not an amplitude of the received spread spectrum coded signal exceeds a predetermined value; a storing portion for storing second data; a second control portion responsive to the comparing portion for generating the communication requesting signal when an amplitude of the received spread spectrum coded signal exceeds a predetermined value, for transmitting the communication requesting signal by operating the antenna portion in the fourth mode; and a third control portion responsive to the second control portion for operating the antenna portion, a second detection portion and a comparing portion for receiving the spread spectrum coded signal amplitude modulated with the first data in the third mode, and for detecting the received first data and storing the first data in the storing portion as the second data.

Further, the first mobile unit identifying system may comprise a fourth control portion responsive to the comparing portion and the third control portion for reading the second data the communication requesting signal when the amplitude of the received spread spectrum coded signal exceeds the predetermined value and for operating the antenna portion in the fourth mode in accordance with the second data.

Moreover, the first mobile unit identifying system may further comprises a power supply control portion responsive to the comparing portion for supplying a supply power to the responder when the amplitude of the received spread spectrum coded signal exceeds a predetermined value.

Further, the first mobile unit identifying system may further comprise a power supply potation for receiving a supply power from an output of the second detection portion and supplying the supply power to the responder.

According to the present invention there is also provided a method of modulating for a first mobile unit identification system having an interrogator for transmitting predetermined electromagnetic waves and receiving reflected the predetermined electromagnetic waves and a responder, having a storing portion storing first data, for transmitting first data by reflecting the electromagnetic waves with modulation by the first data, comprising the steps of: (a) transmitting the predetermined electromagnetic waves from the interrogator to the responder in a first mode; (b) reading the first data from the storing portion and transmitting the first data from the responder by reflecting the electromagnetic waves with modulation by the first data in the first mode; (c) receiving and detecting the transmitted first data by the interrogator in the first mode; (d) modulating the predetermined electromagnetic waves with second data in a second mode; (e) transmitting the second data by transmitting and modulating the predetermined electromagnetic waves modulated with the second data to the responder in the second mode; (f) receiving the predetermined electromagnetic waves by the responder in the second mode; and (g) detecting the second data in the second mode by the responder.

The first method of modulating for a mobile unit identification system may further comprise the steps of: (h) storing the detected second data in the storing portion.

According to the present invention there is further provided a second mobile unit identifying system comprises: an interrogator having: a carrier signal generator for generating a carrier signal; a modulation portion for amplitude-modulating the carrier signal to have a predetermined cycle; a transmission portion for transmitting either the carrier signal from the modulation portion in a first mode or the carrier signal from the carrier signal generator in a second mode; a receiving and demodulation portion for receiving and demodulating a responding signal including a communication request signal and data; a detection portion for detecting the communication request signal from the responding signal from the receiving and demodulation portion; and a first control portion responsive to the detection portion for operating the transmission portion in the second mode when the detection portion detects the communication request signal and for operating the transmission portion in the first mode before the detection portion detects the communication request signal; and a responder having: an antenna portion for receiving the carrier signal from the transmission portion in a third mode and for transmitting the responding signal with modulation of the carrier signal from the transmission portion through reflecting and absorbing the transmitted carrier signal in a fourth mode; a carrier detection portion for detecting the carrier signal from the antenna portion in the third mode; an amplitude-modulation detection portion responsive to the carrier detection portion for detecting whether or not the detected carrier signal is amplitude-modulated with the predetermined cycle; a storing portion for storing data; and a second control portion responsive to the amplitude-modulation detection portion for generating the communication requesting signal when the detected carrier signal is amplitude-modulated with the predetermined cycle, for transmitting the communication requesting signal by operating the antenna portion in the fourth mode, for reading the data from the storing portion, and for transmitting the data from the storing portion by operating the antenna portion in the fourth mode when the detected carrier signal is not amplitude-modulated with the predetermined cycle.

In the second mobile unit identifying system, the second control portion may generate the communication requesting signal in phase with the carrier signal amplitude modulated with the predetermined cycle.

In the second mobile unit identifying system, the antenna portion comprise: an antenna; and a phase modulation circuit having: a plurality of reflection line circuits having a plurality of reflection circuits having different electrical lengths respectively; and a switch for, in the fourth mode, switching connection between the antenna to one of the plurality of reflection line circuits in response to the second control portion.

In the second mobile unit identifying system, the second control portion may generate the communication requesting signal at a regular interval.

In the second mobile unit identifying system, the interrogator may further comprise a second modulating portion for amplitude-modulating the carrier signal to have a second predetermined cycle different from the predetermined cycle and the responder further comprises second amplitude-modulation detection portion for detecting whether or not the detected carrier signal is amplitude-modulated with the second predetermined cycle, the second control portion further responsive to the second amplitude-modulation detection portion for generating the communication requesting signal when the detected carrier signal is amplitude-modulated with the predetermined cycle, for transmitting the communication requesting signal by operating the antenna portion in the fourth mode, for reading the data from the storing portion, and for transmitting the data from the storing portion by operating the antenna portion in the fourth mode when the detected carrier signal is amplitude-modulated with the second predetermined cycle.

In the second mobile unit identifying system, the interrogator may further comprise: spectrum spreading portion for spectrum-spreading the carrier signal from the carrier signal generator with a predetermined pseudo noise signal and the receiving and demodulation portion having inverse spectrum spreading portion for effecting inverse-spectrum-spreading, the receiving and demodulation portion demodulating the responding signal using the inverse spectrum spreading portion, the modulating portion amplitude-modulates the carrier signal from the spread spectrum signal modulation portion to have the predetermined cycle and the transmission portion transmits either the carrier signal from the modulation portion in a first mode or the carrier signal from the spread spectrum signal modulation portion in a second mode.

In the second mobile unit identifying system, the interrogator may further comprise: a second modulation portion for amplitude-modulating the carrier signal from the second carrier signal generator to have a second predetermined cycle shorter than the predetermined cycle in accordance with data, the transmission portion transmitting either the carrier signal from the modulation portion in a first mode or the carrier signal from the second modulation portion in a second mode and the amplitude-modulation detection portion may further comprise a detection portion for detecting whether or not the detected carrier signal is amplitude-modulated with the second predetermined cycle, the responder further comprising third control portion responsive to the detection portion for detecting the data from the detected carrier signal when the detection portion detects the detected carrier signal is amplitude-modulated with the second predetermined cycle and for storing the detected data in the storing portion.

According to the present invention there is also provided a mobile unit identifying system comprising: a plurality of interrogators, each having: a carrier signal generator for generating a carrier signal; a modulation portion For amplitude-modulating the carrier signal to have a predetermined amplitude-modulation cycle; a transmission portion for transmitting either the carrier signal from the modulation portion in a first mode or the carrier signal from the carrier signal generator in a second mode; a receiving and demodulation portion for receiving and demodulating a responding signal including a communication request signal and data; and a detection portion for detecting the communication request signal from the responding signal from the demodulation portion; and a first control portion responsive to the detection portion for operating the transmission portion in the second mode when the detection portion detects the communication request signal and for operating the transmission portion in the first mode before the detection portion detects the communication request signal, wherein the predetermined cycle of each of the plurality of interrogators being different each other, and a responder having: an antenna portion for receiving the carrier signal from the transmission portion in a third mode and for transmitting the responding signal with modulation of the carrier signal from the transmission portion through reflecting and absorbing the transmitted carrier signal in a fourth mode; a carrier detection portion for detecting the carrier signal From the antenna portion in the third mode; an amplitude-modulation detection portion responsive to the carrier detection portion for detecting whether or not the detected carrier signal is amplitude-modulated and detecting the predetermined amplitude-modulation cycle; a storing portion for storing data; and a second control portion responsive to the amplitude-modulation detection portion for generating the communication requesting signal in accordance with the detected predetermined amplitude-modulation cycle when the detected carrier signal is amplitude-modulated, for transmitting the communication requesting signal by operating the antenna portion in the fourth mode, for reading the data from the storing portion, and for transmitting the data from the storing portion by operating the antenna portion in the fourth mode when the detected carrier signal is not amplitude-modulated.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Hereinbelow will be described a first embodiment of this invention.

Figure 1:
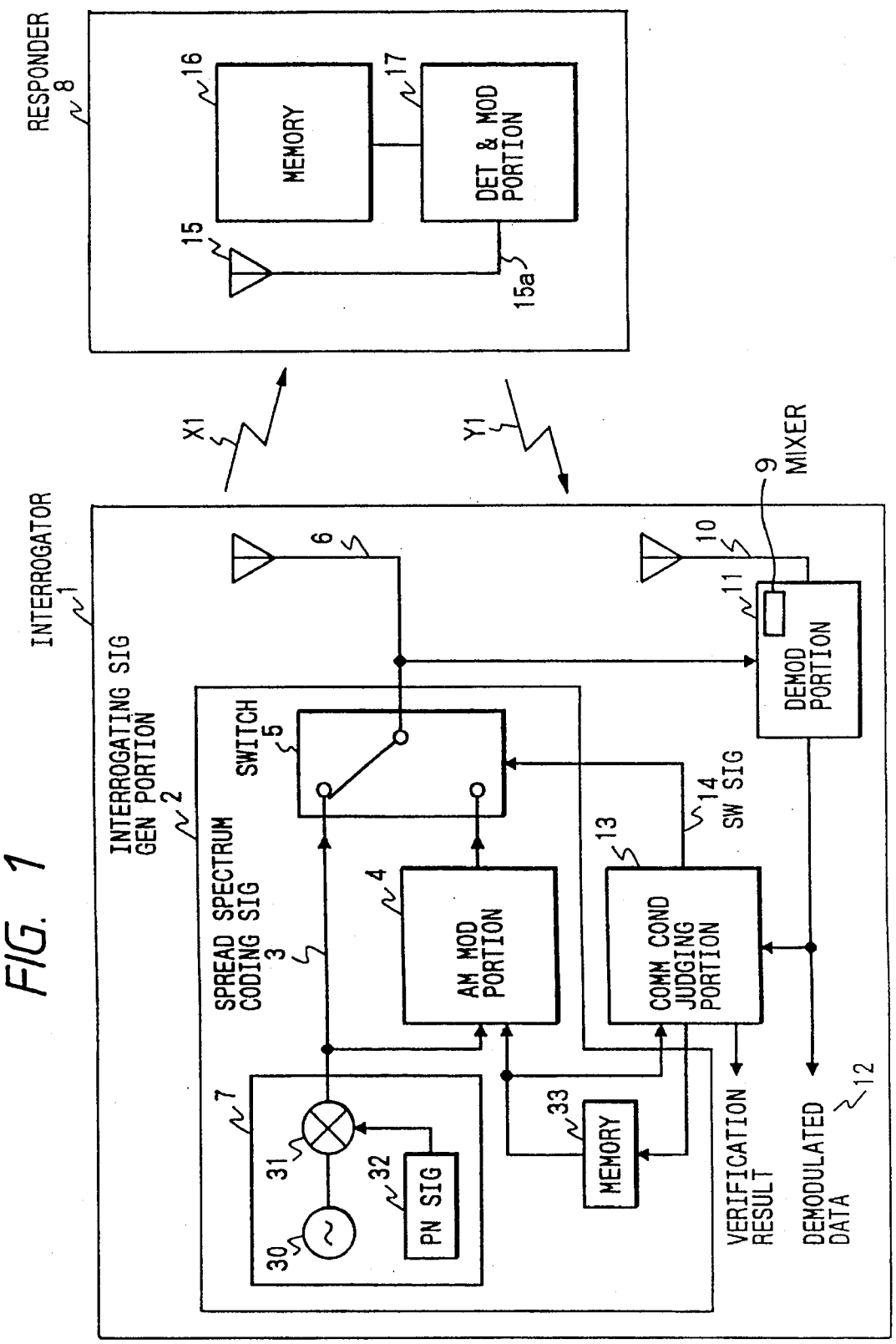
FIG. 1 is block diagram of the first embodiment of a mobile unit identifying system.

FIG. 1 is block diagram of the first embodiment of a mobile unit identifying system. The mobile unit identifying system comprises an interrogator 1 and at least a responder 8. The interrogator 1 comprises a spread spectrum coded signal generation portion 7 for generating a spread spectrum coded signal 3; a memory 38 for storing data; an amplitude shift modulating (amplitude modulation) portion 4 for amplitude-shift-modulating the spectrum-spread carrier signal 3 with the data from the memory 33; a switch 5 for outputting either of the spread spectrum coded signal 8 or an output of the amplitude modulation portion 4 in accordance with a switching signal 14; a transmission antenna 6 for transmitting an output of the switch 5 as an interrogating signal X1; a receiving antenna 10 for receiving a responding signal Y1 from the responder 8; a demodulation portion 11 for demodulating the responding signal Y1 from the antenna 10; and a communication condition judging portion 18 for making a judgement as to whether the communication condition of the interrogator 1 is a first or second mode, generating the switching signal 14 supplied to the switch 5, and controlling the memory 33. The output of the demodulation portion is outputted as a demodulated signal 12.

The responder 8 comprises: an antenna 15 for receiving the transmitted interrogation signal X1 and sending the responding signal Y1 toward the receiving antenna 10 of the interrogator 1; a memory 16 for storing data including an identifying code; and a detection and modulation portion 17: for, in a reading mode, detecting the received interrogation signal X1 from the antenna 15 and then, modulating the received interrogation signal X1 by data or the identification code from the memory 16; and for detecting and demodulating amplitude-shift-modulated data and then, changing the mode of the responder 8 to a writing mode in accordance with the demodulated amplitude-shift-modulated data; and for, in the writing mode, detecting and demodulating amplitude-shift-modulated data and then, storing the data in the memory 16, the antenna 15 Further reflecting the interrogation signal X1 in accordance with the modulation by the detection and modulation portion 17 to send the identify code and data read from the memory 16.

The spread spectrum coded signal generating circuit has a pseudo noise generation circuit 32 for generating one of plural types of pseudo noise signals, an oscillator 30 for generating a carrier signal, and a mixer 31 for mixing the carrier signal with the pseudo noise signal to generate the spread spectrum coded signal.

Operation of the first embodiment will be described.

In a first mode, or reading mode, the spread spectrum coded signal generating circuit 7 of the interrogator 1 generates the spread spectrum coded signal by spread-spectrum-modulating the carrier signal. The spread spectrum coded signal generating circuit 7 spread-spectrum-modulates the carrier signal with a pseud noise signal (PN signal) which is selected from plural types of pseud noise signals generated in the spread spectrum coded signal generating circuit 7. However, a selection circuit for selecting the pseud noise from plural types of pseud noise signals is omitted here. More specifically, in the spread spectrum coded signal generating circuit 7, the pseudo noise generation circuit 32 generates one of plural types of pseudo noise signals, the oscillator 30 generates the high frequency signal as the carrier signal, and the mixer 31 mixes the carrier signal with tile pseudo noise signal to generate the spread spectrum coded signal. The spread spectrum coded signal from the spread spectrum coded signal generation circuit 7 is supplied to the switch 5. The switch 5 supplies the spread spectrum coded signal to the antenna 6 in the first (reading) mode, that is, the switching signal 14 indicates supplying the spread spectrum coded signal to the antenna 6. The antenna 6 transmits the spread spectrum coded signal as the interrogating signal X1 which is also supplied to the mixer in the demodulation portion 11. If the responder 8 exists in or enters a service area of the interrogator 1, the receiving and reflection antenna 15 of the responder 8 receives the interrogating signal X1. The detection and modulation portion 17 in the reading mode modulates the received interrogating signal X1 with modulation data read from the memory 16 by changing the impedance condition of the antenna 15 to the data modulation portion 7. More specifically, the detection and modulation portion 7 alters adequately changing an electrical length of a feeder cable 15a from the antenna 15 to absorb the received interrogating signal X1 and shorting the ends of the feeder cable 15a to reflects the interrogating signal X1 in order to modulate the interrogating signal X1 in accordance with the modulation data read from the memory 16. The modulated interrogating signal X1 is reflected by the antenna 15 as the responding signal Y1.

In the interrogator 1, the receiving antenna 10 receives the responding signal Y1. The received responding signal Y1 is mixed with the spread spectrum coded signal from the spread spectrum coded signal generation circuit 7 via the switch 5 to demodulate the received responding signal Y1 by the demodulating circuit 11 to supply the output demodulated data corresponding to the data read from the memory 16 of the responder 8. This demodulated data provides identification of the responder 8 because the carrier signal is modulated with a predetermined pseudo noise signal as tile interrogating signal X1 which is different from interrogating signals from other interrogators. That is, the responding signal generated from the interrogating signal from another interrogator has no correlation with the spread spectrum coded signal generated by this interrogator 1, so that this responding signal cannot be demodulated but only the responding signal derived from the spread spectrum coded signal generated by this interrogator 1 is demodulated. Therefore, the spread spectrum coded signal generation circuit 7 provides the surer identification of the responder 8 in the service area.

Here, generally, in the mobile unit identification system, a propagation distance, that is a radii of the service area is assumed as several meters which is relatively short. Therefore, a phase difference between the spread coded signal and the received responding signal Y1 is of the order of $10^{-8}$ seconds and is negligible, so that in the interrogator 1, the responding signal Y1 received by the receiving antenna 10 is directly mixed with the spread spectrum coded signal by a mixer 9 included in the demodulation portion 11 to demodulate the responding signal Y1. Therefore, the spread spectrum coded signal generation circuit 7 can be used for the transmission of the interrogating signal X1 and for demodulating the responding signal Y1 with a simple structure because a complicated phase matching between the spread spectrum coded signal and the received responding signal Y1 is unnecessary.

The communication condition judging portion 13 detects whether or not the responding signal has been received by detecting whether or not the demodulated data satisfies a predetermined condition, for example, the demodulated data has a predetermined format. Moreover, a judgement may be made as to whether the demodulated data has been transmitted a predetermined times. For example, the responding signal is transmitted three times. When the communication condition judging portion 13 detects that the responding signal has been received, it changes a logic state of the switching signal 14. That is, the communication condition judging portion 13 changes the mode of the interrogator 1 from the first (reading) mode to the second (mode-change and writing) mode.

In the second mode, the switch 5 supplies the amplitude modulated spread spectrum coded signal to the antenna 6. The amplitude modulation portion 4 amplitude-modulates the spread spectrum coded signal 3 with a predetermined code indicative of mode-change of the responder 8 read from the memory 33. Therefore, the interrogation signal X1 carries the predetermined code (mode-change code) through the amplitude modulation.

Figure 6:
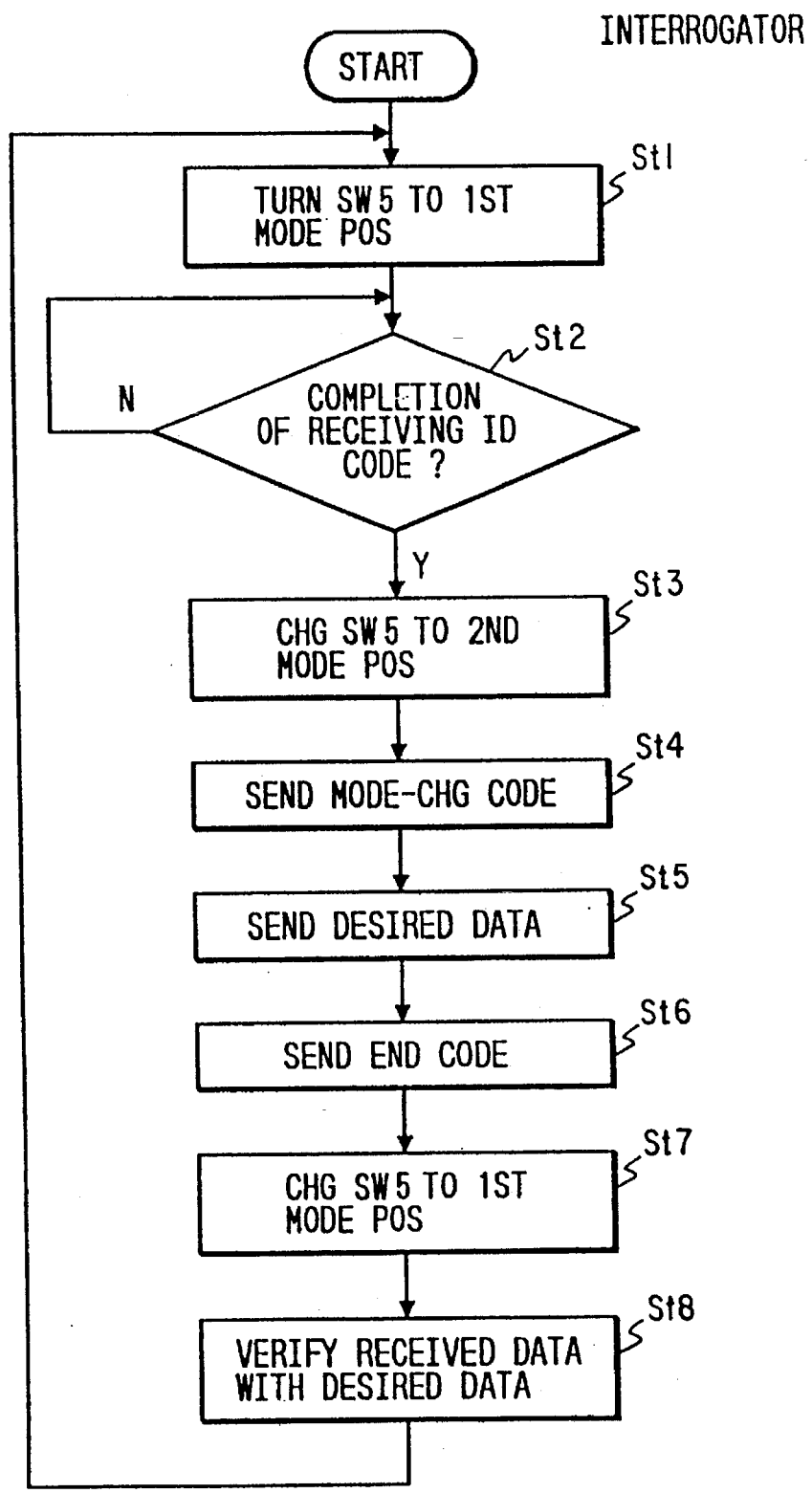
FIG. 6 shows a flow chart of the first embodiment showing an operation of the communication condition judging portion.

FIG. 6 shows a flow chart of the first embodiment showing an operation of the communication condition judging portion 13. The communication condition judging portion 13 comprises a microprocessor and executes a control program as shown in the flow chart shown in FIG. 6.

In the first step st1, the communication condition judging portion 13 turns the switch 5 to the first (reading) mode position, that is, the switch 5 outputs the spread spectrum coded signal. In the following step st2, communication condition judging portion 13 makes a decision as to whether or not the reception of the identification code transmitted by the responding signal Y1 has been completed. If the answer is NO, processing loops there to wait the completion of the reception of the identification code. If the answer is YES, processing proceeds to step st3. In step st3, the communication condition judging portion 13 changes the switch 5 to the second (mode-change and writing) mode position. That is, the communication condition judging portion 13 outputs the amplitude modulated spread spectrum coded signal. In the following step st4, the communication condition judging portion 13 sends the mode-change code read from the memory 33 by amplitude modulation. This change the mode of the responder 8 to the writing mode. In the following step st5, the communication condition judging portion 13 sends desired data read from the memory 33. This causes the responder 8 to store the transmitted desired data in the memory 16. In the following step st6, the communication condition judging portion 13 sends an end code to the responder. This makes the responder 8 the reading mode and returning the desired data to the interrogator 1. The communication condition judging portion 13 changes the switch 5 to the first mode position in step st7. In the following step st8, the communication condition judging portion 13 verifies the data received from the responder 8 with the desired data stored in the memory 33 and outputs the verification result.

Figure 2:
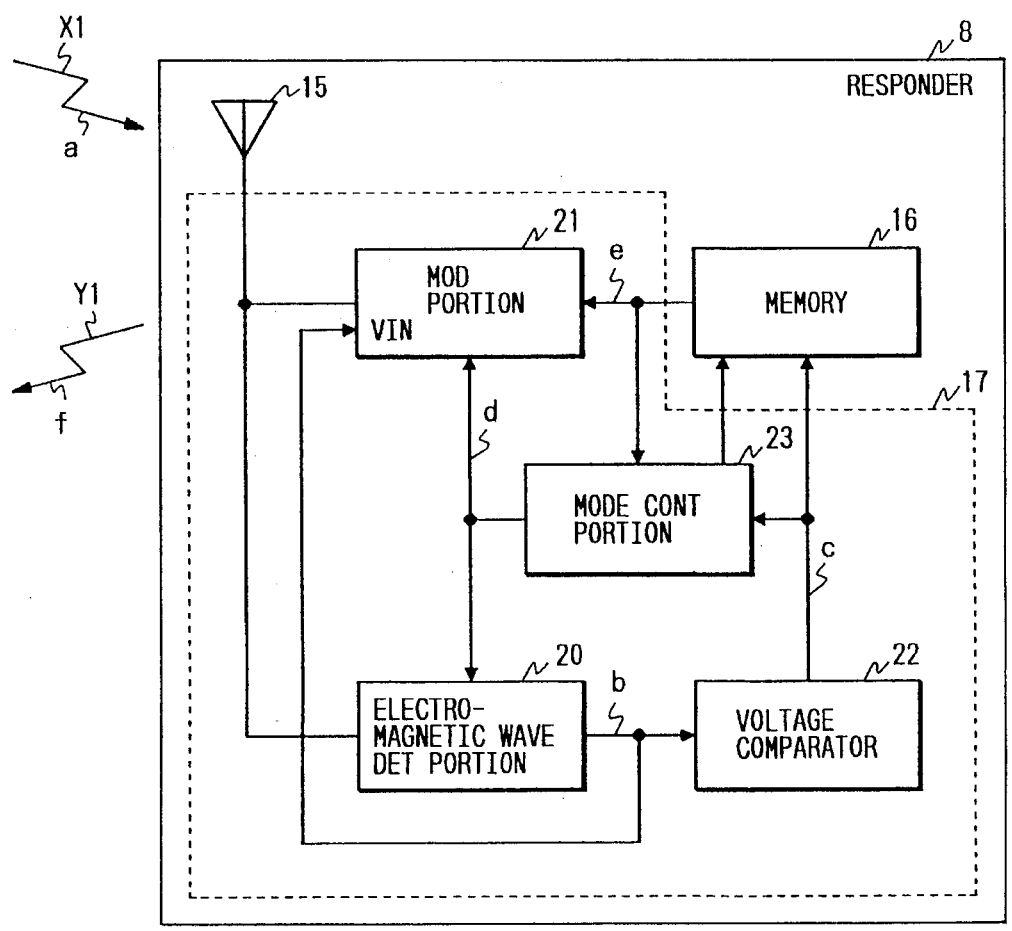
FIG. 2 is a partial block diagram of the first embodiment showing a structure of the detection and modulation portion shown in FIG. 1.

FIG. 2 is a partial block diagram of the first embodiment showing a structure of the detection and modulation portion 17 shown in FIG. 1. The detection and modulation portion 17 comprises an electromagnetic wave detection portion 20 for detecting the interrogation signal X1 and outputting a detection signal "b" in a detection mode; a voltage comparator 22 for comparing the detection signal "b" from the electromagnetic wave detection portion 20 with a predetermined reference voltage and outputting a comparing output "c"; a mode control portion 23 for changing a mode of the responder 8 between the detection mode and a modulation mode and for controlling the memory 16; the memory 16 for storing identification code and external data from the comparing output "c" and outputting the identification code or the external data under control of the mode control portion 23; and a modulation portion 21 for modulating the interrogating signal X1 with the identification code from the memory 16 by changing an impedance condition of the antenna 15 to reflect or absorb the interrogating signal X1 to transmit the modulation signal as the responding signal Y1 in the modulation mode. The modulation portion 21 and electromagnetic wave detection portion 20 operates alternatively in accordance with the mode signal "d".

Figure 7:
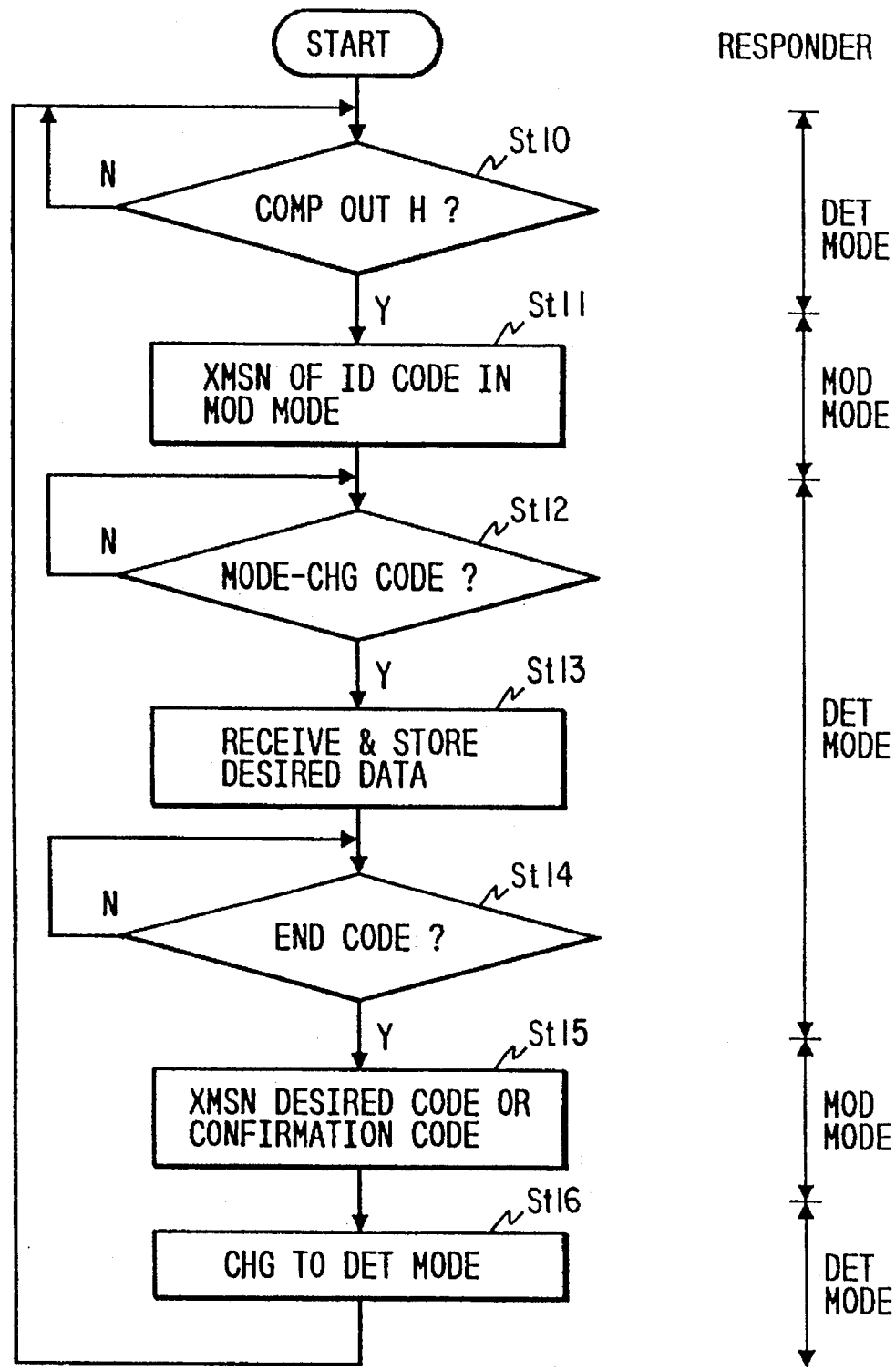
FIG. 7 shows a flow chart of the first embodiment showing an operation of the mode control portion of the responder.

FIG. 7 shows a flow chart of the first embodiment showing an operation of the mode control portion 23 of the responder 8. The mode control portion 23 comprises a microprocessor for executing the program as shown by the flow chart shown in FIG. 7.

Figure 3:
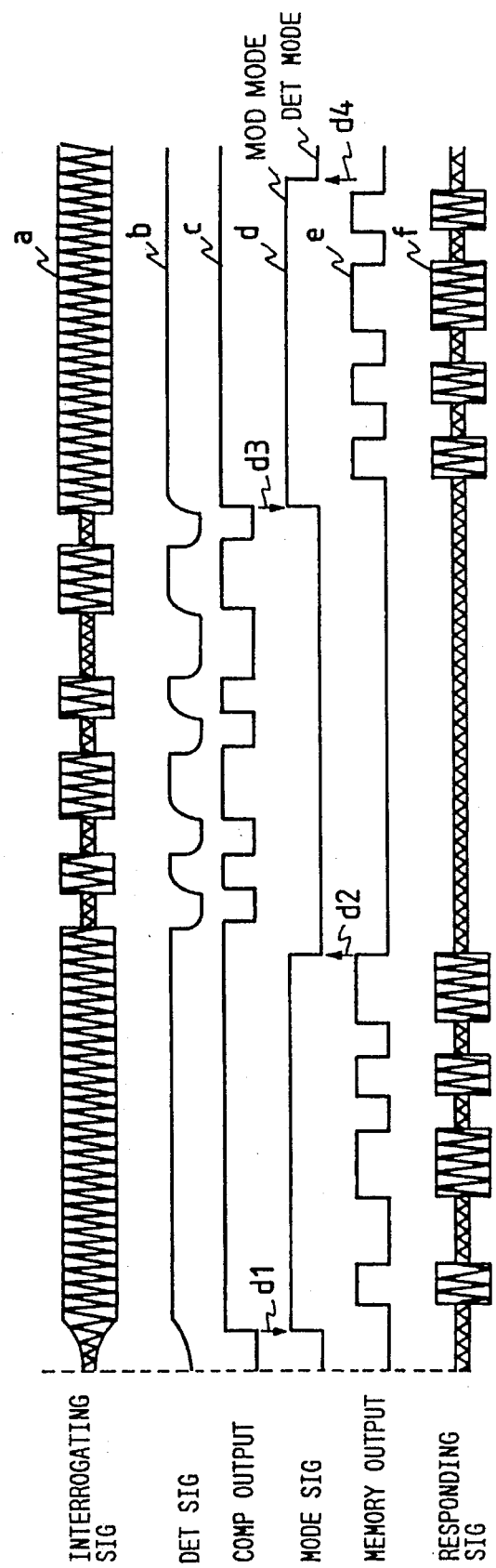
FIG. 3 shows waveforms of the first embodiment showing waveforms at respect outputs of the responder and the interrogating signal from the interrogator.

FIG. 3 shows waveforms of the first embodiment showing waveforms at respect outputs of the responder 8 and the interrogating signal from the interrogator. In FIG. 3, at first, the interrogator 1 transmits the interrogation signal X1 having a predetermined magnitude and the responder 8 is in the detection mode. When the responder 8 enters a service area of the interrogator 1, a magnitude of the interrogating signal received by the antenna 15 increases as shown by a waveform "a". The electromagnetic wave detection portion 20 detects this and outputs the detection signal as shown by the waveform "b". The voltage comparator 22 detects that the detection signal exceeds the predetermined reference voltage at a timing d1 as shown by the waveform "c". The mode control portion 23 detects this and changes the logic level of the mode signal "d" from L to H, i.e., to the modulation mode, at the timing d1 as shown by a waveform "d". The mode control portion 23 operates the memory 16 to output the memory output as shown by a waveform "e" and operates the modulation portion 21 to modulate the interrogating signal X1 to send an identification code of the responder 8 as shown by a waveform "f" in steps st10 and st11. After transmission of the identification code, the mode control portion 23 changes the mode of the responder 8 to the detection mode again at a timing d2 as shown by tile waveform "d".

The interrogator 1 demodulate the responding signal Y1 and the communication condition judging portion 13 detects the end of the transmission of the responding signal indicative of the identification code by detecting that the demodulated data has the predetermined format. Then, the communication condition judging portion 13 changes the switching signal to supply the amplitude modulated spread spectrum coded signal via the switch 5 to the antenna 6 (step st3). The amplitude modulation portion 4 amplitude-shift-modulates the spread spectrum coded signal with a predetermined mode change code stored therein (step st4), so that the interrogating signal X1 indicative of the mode change code is transmitted from the antenna 6 to the responder 8. The responder 8 in the detection mode after the timing d2 detects the mode change code by the mode control portion in step st12. That is, the magnitude of the interrogating signal is amplitude modulated as shown by the waveform "a" and the electromagnetic wave detection portion 20 detects this and tile voltage comparator 22 waveshapes the output of the electromagnetic wave detection portion 20. The mode control portion 23 detects the mode change code.

After a predetermined interval from the transmission of the mode change code, the communication condition judging portion 13 operates the memory 33 to supply desired data to the amplitude modulation portion 4 (step st5). The amplitude modulation portion modulated the spread spectrum coded signal with the desired data which is transmitted to the responder.

In the responder 8, after the predetermined interval from the reception of the mode change code, the mode control portion 28 operates the memory 16 to stored the desired data detected by the electromagnetic wave detection portion 20 and the voltage comparator 22 in step st13.

After transmission of the desired data, the interrogator 1 reads an end code having several bits of data from the memory 33 to transmits the end code through the interrogating signal X1 (step st6).

When the mode control portion 23 detects the end code by watching the comparing output "c" in step st14, the mode control portion changes the mode of the responder 8 to the modulation mode at a timing d3. The mode control portion 23 operates the memory 16 to supply the stored desired data to the modulation portion 21 to transmits the desired data to the interrogator by selectively reflecting the interrogation signal or transmitting a confirmation code in step st15 After completion of the transmitting of the stored desired data, the mode control portion 23 changes the mode of the responder 8 to the detection mode at a timing d4 in step st16.

The interrogator 1 receives the responding signal Y1 indicative of the desired data from the responder 8 and the communication judging portion confirms that the desired data has been transmitted to the responder 8 or verify the received data with the desired data stored in the memory 33 (step st8). The interrogator 1 transmits the interrogating signal having the predetermined magnitude continuously after the timing d4.

As mentioned above, with the spread spectrum coded signal, data stored in the responder 8 can be read and written by changing the mode of the responder between the detection and modulation modes.

In the above-mentioned embodiment, the antenna 6 for transmission and the antenna 10 for reception are separately provided. However, it is also possible to use only one antenna together with an isolator. Moreover, the antenna 15 of the responder 8 is commonly used for receiving and transmission. However, it is also possible to provide two antennas for transmission and receiving separately.

Further, the detection and modulation portion 17 of the responder 8 effects the amplitude modulation of the main carrier. However, tile detection and modulation portion 17 may effect the amplitude modulation to a sub-carrier of the interrogating signal when the interrogator transmits the sub-carrier signal together with the main carrier signal in the interrogating signal. Further, the responder 8 may effects the modulation by the phase shift modulation.

Moreover, the mixer 31 and the PN signal generator 32 can be omitted. That is, the carrier signal may be amplitude modulated without spectrum spreading and transmitted.

Figure 4:
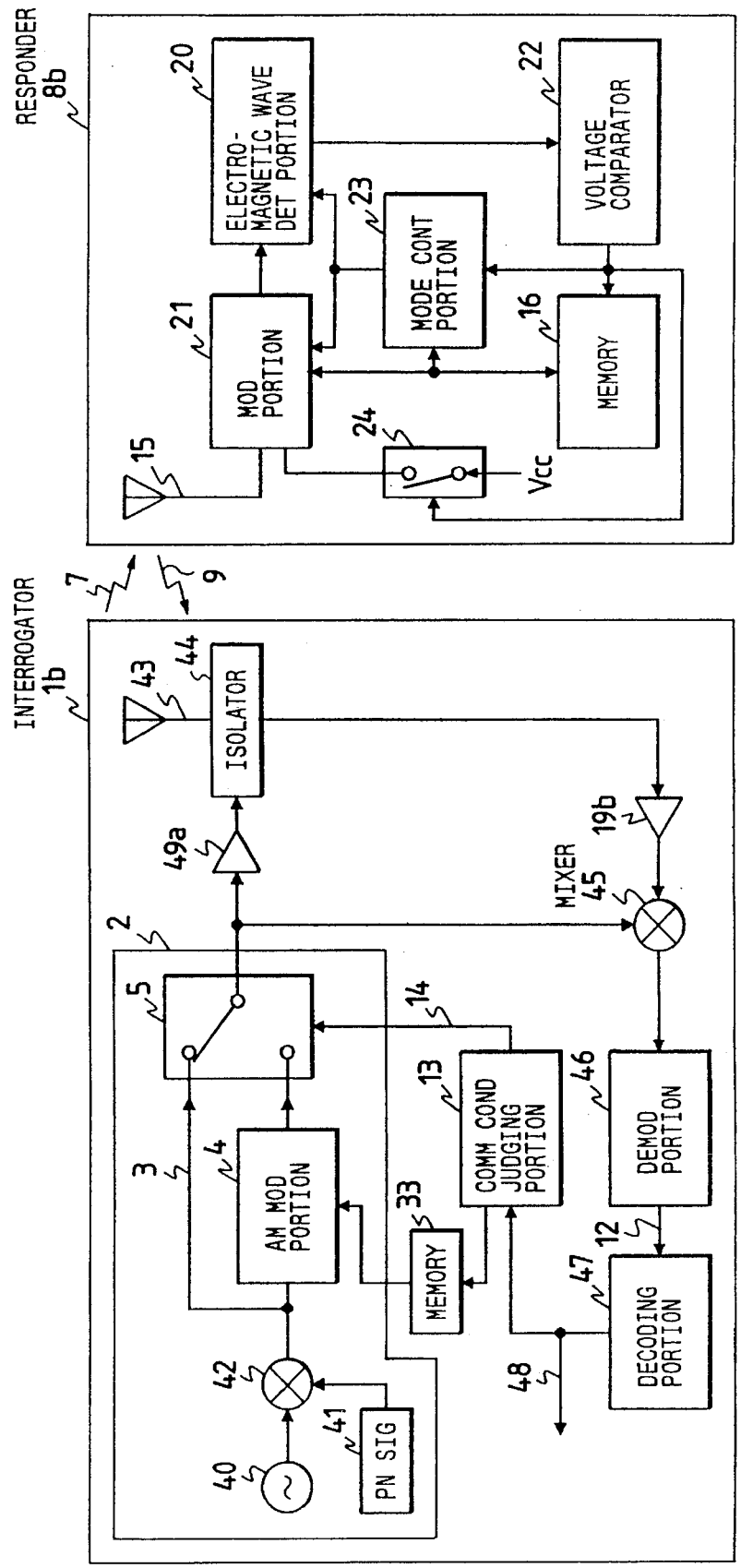
FIG. 4 is a block diagram of the second embodiment of a mobile unit identifying system.
Figure 5:
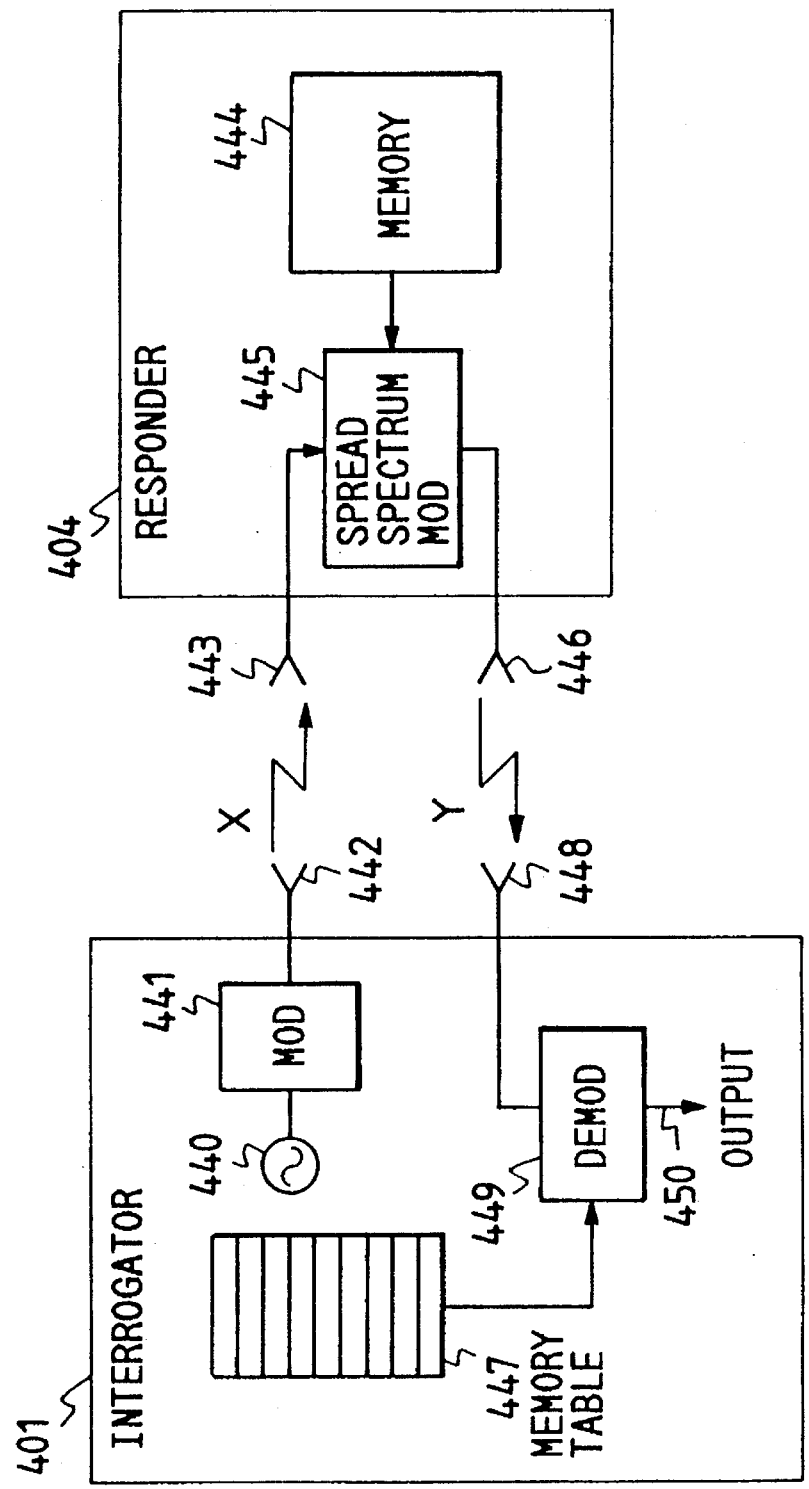
FIG. 5 is a block diagram of such a prior art mobile unit identification system.

FIG. 4 is a block diagram of the second embodiment of a mobile unit identifying system.

The structure of the second embodiment is similar to the first embodiment. The differences between the first and second embodiment are as follows:

In the interrogator 1b, the antennas 6 and 10 is replaced by a single antenna 43. With the replacement of the antenna, an isolator 44, amplifiers 49a and 49b are provided. However, this modification is provided for showing variation of the antenna system and the basic operation is similar to the first embodiment. This modification provides a miniaturization and reduction in a manufacturing cost of the interrogator 1

Moreover, a decoded portion 47 is provided. In the first embodiment, the communication condition judging portion 13 detects the communication condition from the output of the demodulation portion 11 because in the case of the amplitude modulation, the output of the demodulation portion 11 provides the communication condition. However, if the responder effects modulation by a sub-carrier amplitude modulation or phase shift modulation, it is desirable that the communication condition judging portion judges the communication condition from the output of the decoded portion 47.

In connection with the responder 8b, in the first embodiment, the modulation portion 21 and the electromagnetic wave detection portion 20 operates alternatively in accordance with the mode signal "d". However, in the second embodiment, the modulation portion 21 and the electromagnetic wave detection portion 20 are connected in series. If tile modulation in the responder 8b is of the amplitude shift modulation or the sub-carrier amplitude shift modulation, this connection is possible. That is, when the modulation is not performed, the interrogating signal from the antenna 15 passes through the modulation portion 21 as it is to supply it to the electromagnetic wave detection means 20. When the modulation is performed, the electromagnetic wave detection portion 20 is used as a load for termination. Alternatively, an additional load is provided before the electromagnetic detection portion 20 and connected in series with the modulation portion. Further, it is also possible that tile modulation portion 21 and the electromagnetic wave detection portion 20 are connected in parallel and operated at the same time. Therefore, the mode control portion 23 is not always necessary with respect to the operation of the modulation portion 21 and the electromagnetic wave detection portion 20.

Moreover, the supply power for the modulation portion 21 is controlled by a switch 24. When the modulation is not required, the supply power Vcc is cut off by the switch 24 in accordance with the comparing result of the voltage comparator 22, so that if the responder 8b does not exist in the service area of the interrogator 1b, the power consumption is reduced. Further, the switch 24 can be omitted. As shown in FIG. 2, the modulation portion 21 is supplied with a power from the output of the electromagnetic wave detection portion 20. Therefore, the modulation portion only consumes the supply power when a sufficient power is received by the antenna 15.

Figure 8:
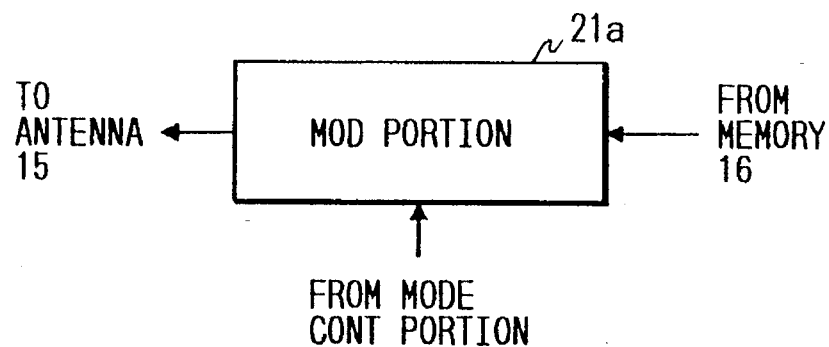
FIGS. 8 to 10 are partial block diagram showing modifications of the first and second embodiments.
Figure 9:
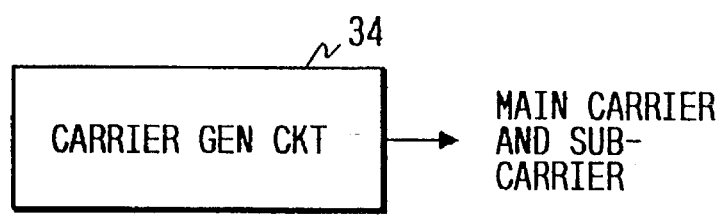
Figure 10:
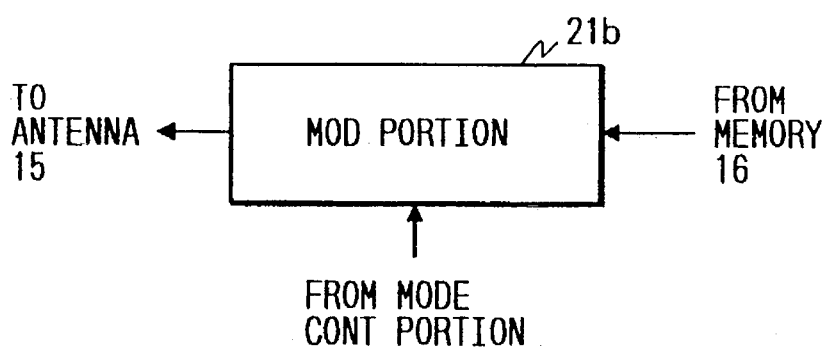

FIGS. 8 to 10 are partial block diagram showing modifications of the first and second embodiments. In FIG. 8, a modulation portion 21a phase-shift-modulates the interrogating signal X1. In FIG. 9, a carrier generating circuit 34 generates a carrier and a sub-carrier and are replaced with tile spread spectrum coded signal generation circuit 7 shown in FIG. 1. In FIG. 10, a modulation portion 21b amplitude-shift-modulates a sub-carrier component from the carrier generating circuit 34 shown in FIG. 9 if the spread spectrum coded signal generation circuit 7 is replaced by the carrier generation circuit 34.

In the above-mentioned embodiment, the order of transmission operation is as follows:

At first, the interrogator 1 transmits the interrogation signal X1 having a fixed amplitude toward the responder 8. The responder 8 transmits the responding signal Y1, or reflects the interrogating signal X1 with modulation by data including the identification code as the responding signal Y1. The interrogator receives the responding signal and transmits data including the mode-change-code by the amplitude-shift-modulation. The responder 8 receives and detects the amplitude-shift-modulated mode-change-code. In response to the mode-change-code, the responder 8 changes the mode thereof to the writing mode. The interrogator 1 transmits the desired data and the end code following the desired data by the amplitude-shift modulation. The responder 8 receives and detects the amplitude-shift-modulated desired data and stores the detected desired data in the memory 16.

However, this order can be changed. For example, the interrogator 1 transmits the desired data. The responder 8 receives the desired data and detects and stores the desired data and then, returns the responding signal Y1 by reflecting the interrogating signal X1 indicative of the identification code. In response to the reception of the identification code, the interrogator transmits data for verification to the responder 8. If there is an error in verification, the responder 8 sends a request signal to the interrogator for resending the desired data.

Figure 11:
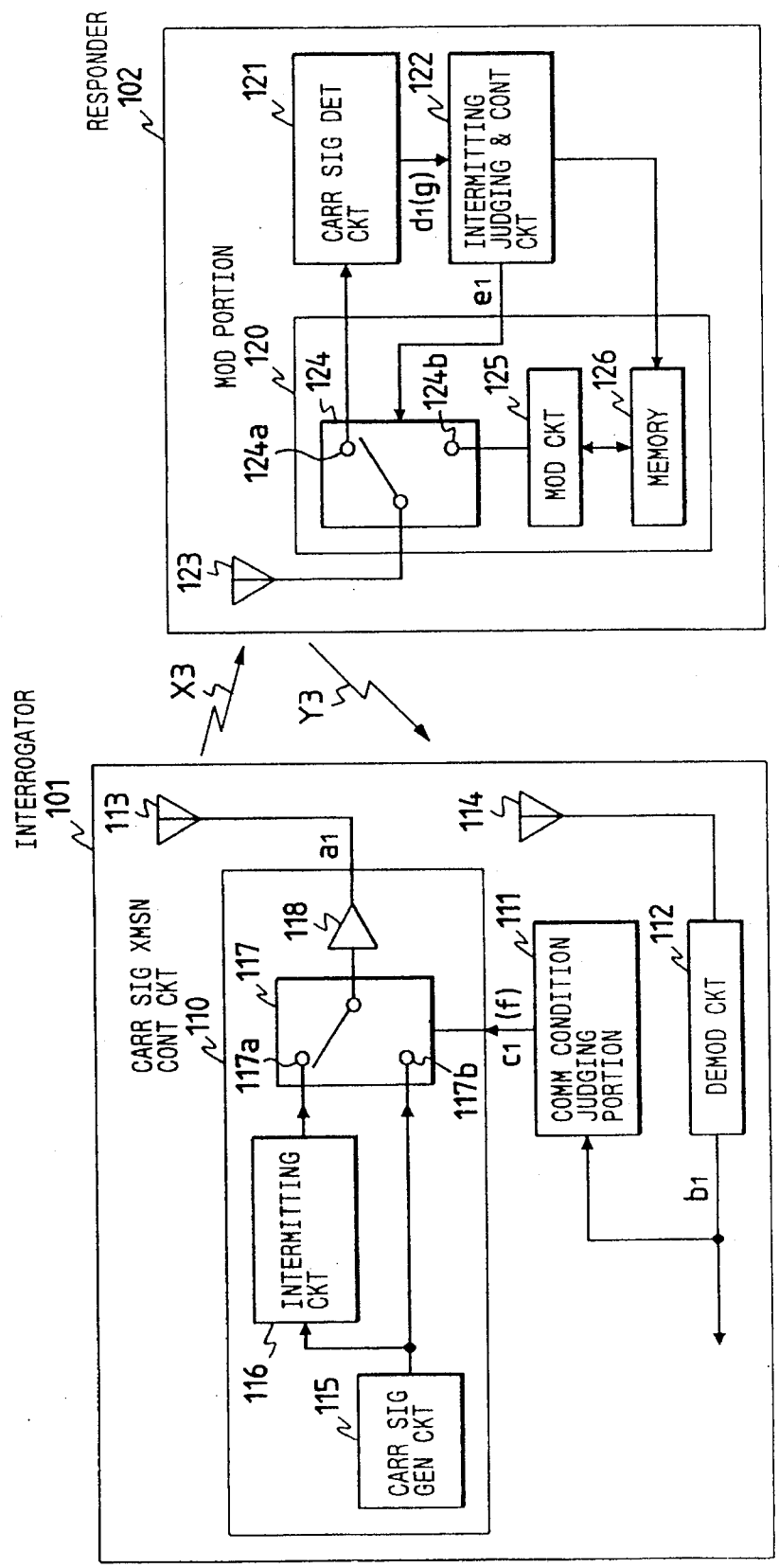
FIG. 11 is a block diagram of a third embodiment of a mobile unit identification system.

FIG. 11 is a block diagram of a third embodiment of a mobile unit identification system.

The mobile unit identifying system of the third embodiment comprises an interrogator 101 and at least a responder 102. The interrogator 101 comprises a carrier signal generation circuit 115 for generating a carrier signal; an intermitting circuit 116 for intermittently outputting the carrier signal as an amplitude modulation circuit; a switch 117 for outputting either of the carrier signal or an output of the intermitting circuit in accordance with a switching signal e1; a power amplifier 18 for amplifying an output of the switch 117; a transmission antenna 113 for transmitting an output of the switch 117 as an interrogating signal X3; a receiving antenna 114 for receiving a responding signal Y3 from the responder 102; a demodulation circuit 12 for demodulating the responding signal Y3 from the antenna 114; and a communication condition judging portion 111 for making a judgement as to whether the demodulation signal b1 from the demodulation circuit 112 is the communication requesting signal and generating the switching signal c1 supplied to the switch 117.

The responder 102 comprises: an antenna 123 for receiving the transmitted interrogation signal X3 and sending the responding signal Y3 toward the receiving antenna 114 of the interrogator 101; a switch 124 for outputting the received interrogation signal X3 to the carrier signal detection circuit 121 in a receiving mode; an intermitting judging and control circuit 122 for judging whether or not the received interrogating signal X3 intermittently transmitted and for producing a control signal e1; a memory 126 for storing data; a modulation circuit 125 for producing the modulation signal and supplies the modulation signal to the antenna 123, the switch 124 outputting the modulation signal in response to the control signal e1 in a modulation mode.

Figure 12:
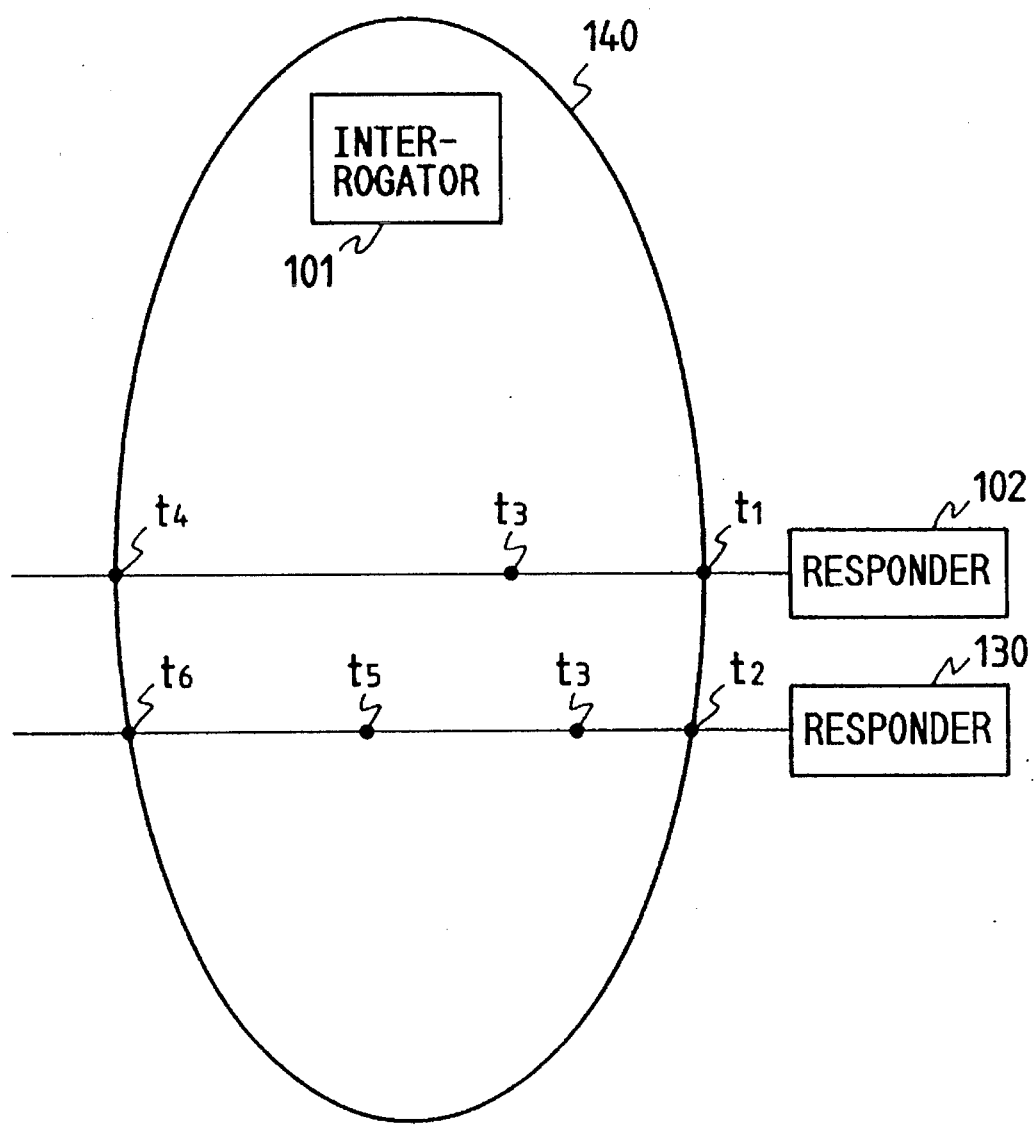
FIG. 12 is an illustration of the third embodiment showing a positional and timing relations among the interrogator and responders.
Figure 13:
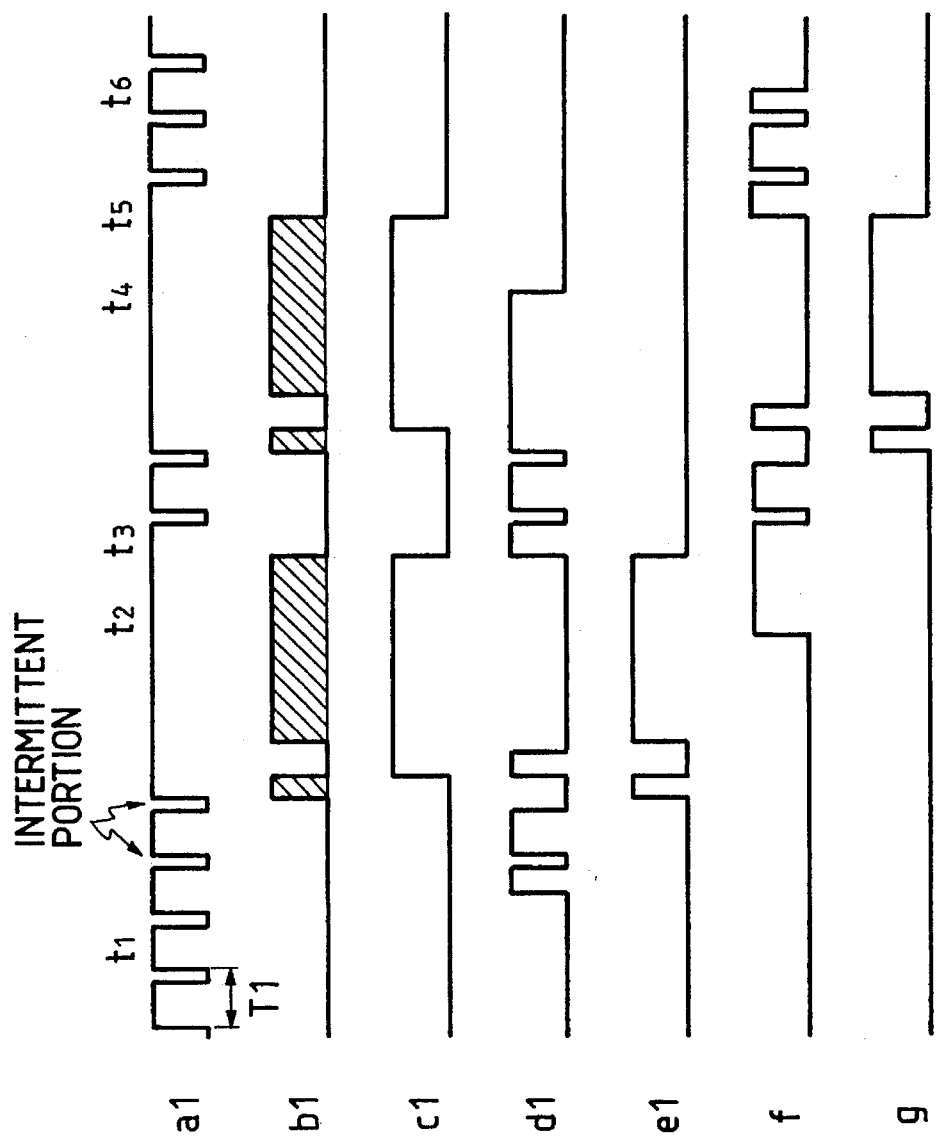
FIG. 13 shows waveforms of the third embodiment showing signals at respective outputs in the interrogator 101 and responders.

FIG. 12 is an illustration of the third embodiment showing a positional and timing relations among the interrogator 101, responders 102 and 130. The responder 130 has substantially the same structure as the responder 102. FIG. 13 shows waveforms of the third embodiment showing signals at respective outputs in the interrogator 101 and responders 102 and 130 wherein the signals f and g shown in the responder 130 corresponds to the switching signal c1 and an output d1 of the carrier signal detection circuit 121.

An operation of the third embodiment will be described.

In the interrogator 101, the carrier signal generation circuit 115 generates the carrier signal. The intermitting circuit 116 intermittently supplies the carrier signal at predetermined interval T1, i.e., supplies an intermittent carrier signal, to the switch 117 The switch 117 supplies the intermittent carrier signal to the power amplifier 118 in a standby mode. The intermittent carrier signal is amplified by the power amplifier 118 and transmitted toward the responders as the interrogating signal X3. More specifically, the intermitting circuit 116 outputs the carrier signal for a predetermined interval shorter than the interval T1 at regular interval T1.

At a timing t1, the responder 102 enters the service area 101 of the interrogator 101. The responder 102 detects the transmitted carrier signal by the carrier signal detection circuit 121 and detects the intermitting of the carrier signal at the interval T1 by the intermitting judging and control circuit 122. An output of the intermitting judging and control circuit 122 changes the switch 124 to a transmission mode and operates the memory 126 to supply data of the communication requesting signal to the modulation circuit 125. Then, the modulation circuit 125 transmits a communication requesting signal with modulation by reflecting the interrogating signal X3 (reflection modulating) as the responding signal Y3.

The interrogator 101 receives the responding signal Y3 by the antenna 114 and demodulates the responding signal by the demodulation circuit 112. The demodulation circuit 112 outputs a demodulation signal b1. The communication condition judging portion 111 judging that the responding signal indicates the communication requesting signal and outputs the switching signal e1. In response to the switching signal e1, the switch supplies the carrier signal to the power amplifier 118 directly to transmit the continuous carrier signal as the interrogating signal X3. The responder 102 detects that the interrogating signal has no interruption for the predetermined interval T1 by the intermitting judging and control circuit 122. Then, the intermitting judging and control circuit 122 operates the memory 126 to supply desired data (communication data) to the modulation circuit 125. Therefore, the modulation circuit 125 performs reflection modulating to transmit the desired data thorough the antenna 123. The responder 102 communicates with the interrogator 101 once when the responder 102 enters the service area of the interrogator 101.

When the communication between the responder 102 and the interrogator 101 finishes, the communication condition judging portion 111 detects this and switches the switch 117 to supply the output of the intermitting circuit 116 to the power amplifier to transmit the intermittent carrier signal.

The responder 130 which entered the service area 140 at a timing t2 detects that the interrogating signal X3 is a continuous carrier signal and judges that the interrogator is communicating with another responder. Therefore, the responder 130 does not perform the reflection modulation. When the responder 130 detects that the interrogating signal X3 is the carrier signal intermittently transmitted after the timing t3, the responder 130 transmits the communication requesting signal and then, transmits desired data (communication data) to the interrogator 101.

Figure 14A:
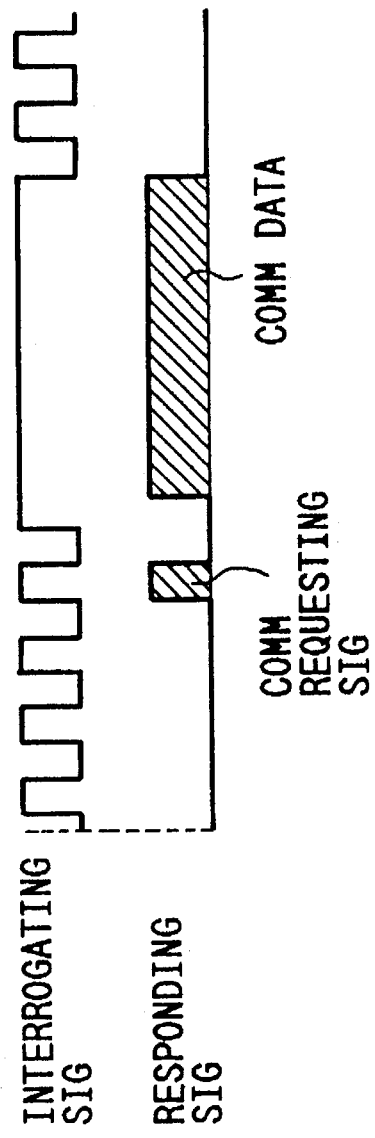
FIGS. 14A and 14B shows modifications of the first embodiment showing waveforms of the interrogation signal and the responding signal.
Figure 14B:
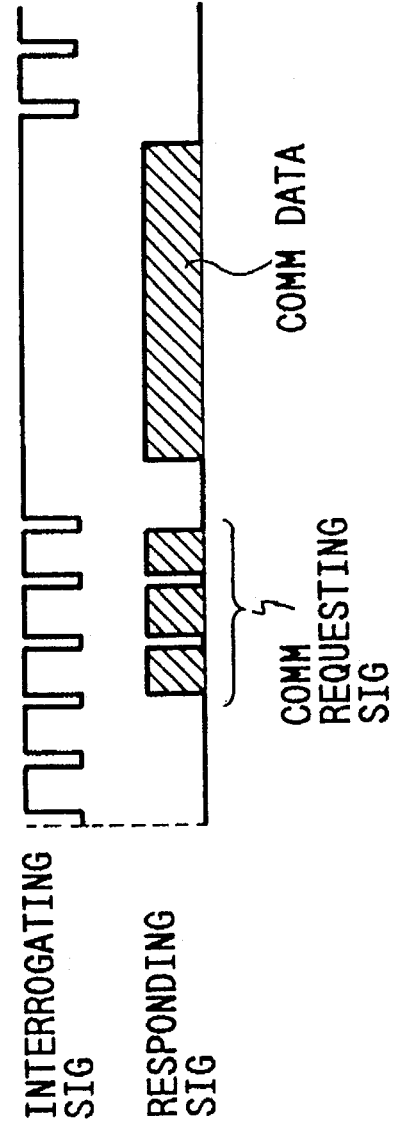

FIGS. 14A and 14B show modifications of the third embodiment showing waveforms of the interrogation signal X3 and the responding signal. In FIG. 14A, the communication requesting signal is transmitted during the interval where the carrier signal is transmitted intermittently. In FIG. 14B, the communication requesting signal is transmitted in phase with tile intermittently transmitted carrier signal. Therefore, it is possible that the communication requesting signal has a large amount of data compared with one period of the intermittently transmitted carrier signal.

Figure 15:
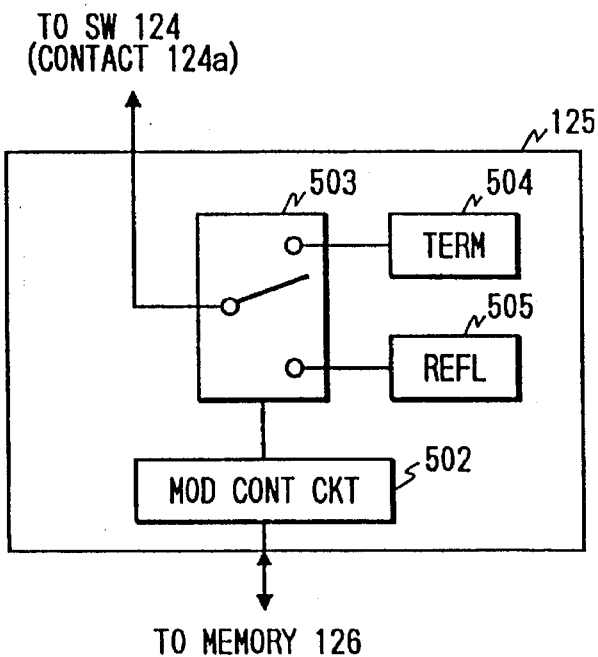
FIG. 15 is a partial block diagram of the third embodiment showing an example structure of the modulation circuit.

FIG. 15 is a partial block diagram of the third embodiment showing an example structure of the modulation circuit 125.

The modulation circuit 125 comprises: a modulation control circuit 502; a switch 503; a terminating circuit 504; and a reflection circuit 505. The switch 503 connects the contact 124a of the switch 124 shown in FIG. 11 to either tile terminating circuit 504 or the reflection circuit 505 in response to an output of the modulation control circuit 502. The modulation control circuit 502 controls the switch 503 in accordance with data read from the memory 126. Therefore, the interrogating signal X3 is subjected to the reflection modulation in accordance with the data read from the memory 126. The intermitting judging and control circuit 122 controls the memory 126 to read the data for the communication requesting signal and the desired data (communication signal) stored in the memory 126. That is, when the intermitting judging and control circuit 122 judges that the interrogating signal X3 has intermittent portions, the switch 124 is turned to the side of the modulation circuit 125 and controls the memory 126 to read data of tile communication requesting signal to perform the reflection modulation. Then, the intermitting judging and control circuit 122 controls the memory 126 to read the communication data.

Figure 16:
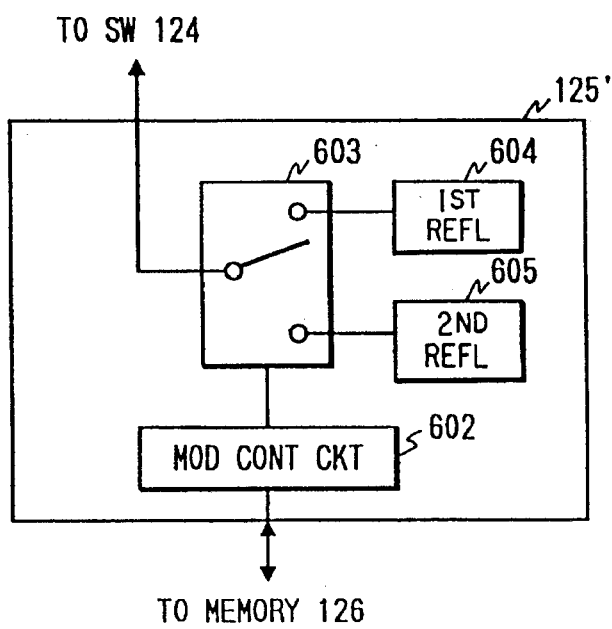
FIG. 16 is a partial block diagram of the first embodiment showing another example structure of the modulation circuit.

FIG. 16 is a partial block diagram of the third embodiment showing another example structure of the modulation circuit 125'.

The modulation circuit 125' comprises: a modulation control circuit 602; a switch 603; a first reflection circuit 604 having a first electrical length; a second reflection circuit 605 having a second electrical length different from the first electrical length. The switch 603 connects the contact 124a to the first reflection circuit 604 or the second reflection circuit 605 in response to an output of the modulation control circuit 602. The modulation control circuit 602 controls the switch 603 in accordance with data read from the memory 126. Therefore, the interrogating signal X3 is subjected to the reflection phase shift modulation in accordance with the data read from the memory 126. The intermitting judging and control circuit 122 controls the memory 126 to read the data for the communication requesting signal and the desired data (communication signal) stored in the memory 126. That is, when the intermitting judging and control circuit 122 judges that the interrogating signal X3 has intermittent portions, the switch 124 is turned to the side of the modulation circuit 125 and controls the memory 126 to read data of the communication requesting signal to perform the reflection modulation. Then, the intermitting judging and control circuit 122 controls the memory 126 to read the communication data.

As mentioned above, the interrogator 101 transmits the carrier signal intermittently in the standby mode and when the interrogator 101 detects the communication requesting signal, the interrogator 101 transmits the carrier signal continuously. The responder 102 starts the communication with the interrogator 101 when the responder detects that the interrogator 101 is in the standby mode by detecting that the interrogating signal has the intermittent portions and the responder 102 does not communicate with the interrogator 101, i.e., does not perform the reflection modulation when the carrier signal is continuously transmitted as the interrogating signal X3. Therefore, there are a plurality of responders in the service area of the interrogator can communicate with the interrogator without interferences. That is, a first responder does not interfer a second responder under a communication with the interrogator 101. The first responder can communicate with the interrogator 101 after the communication between the second responder and the interrogator.

In the above-mentioned embodiment, the carrier signal is intermittently transmitted in the standby mode. However, this is considered as one of amplitude modulation of the carrier signal to have a predetermined period. Moreover, in the above-mentioned embodiment, the carrier signal is stopped at the intermittent period. However, the carrier signal may be transmitted at a first intensity and then, a second intensity smaller than the first intensity. This sequence is repeated and the intermitting judging and control circuit 122 detects the repetition of this sequence.

Figure 25:
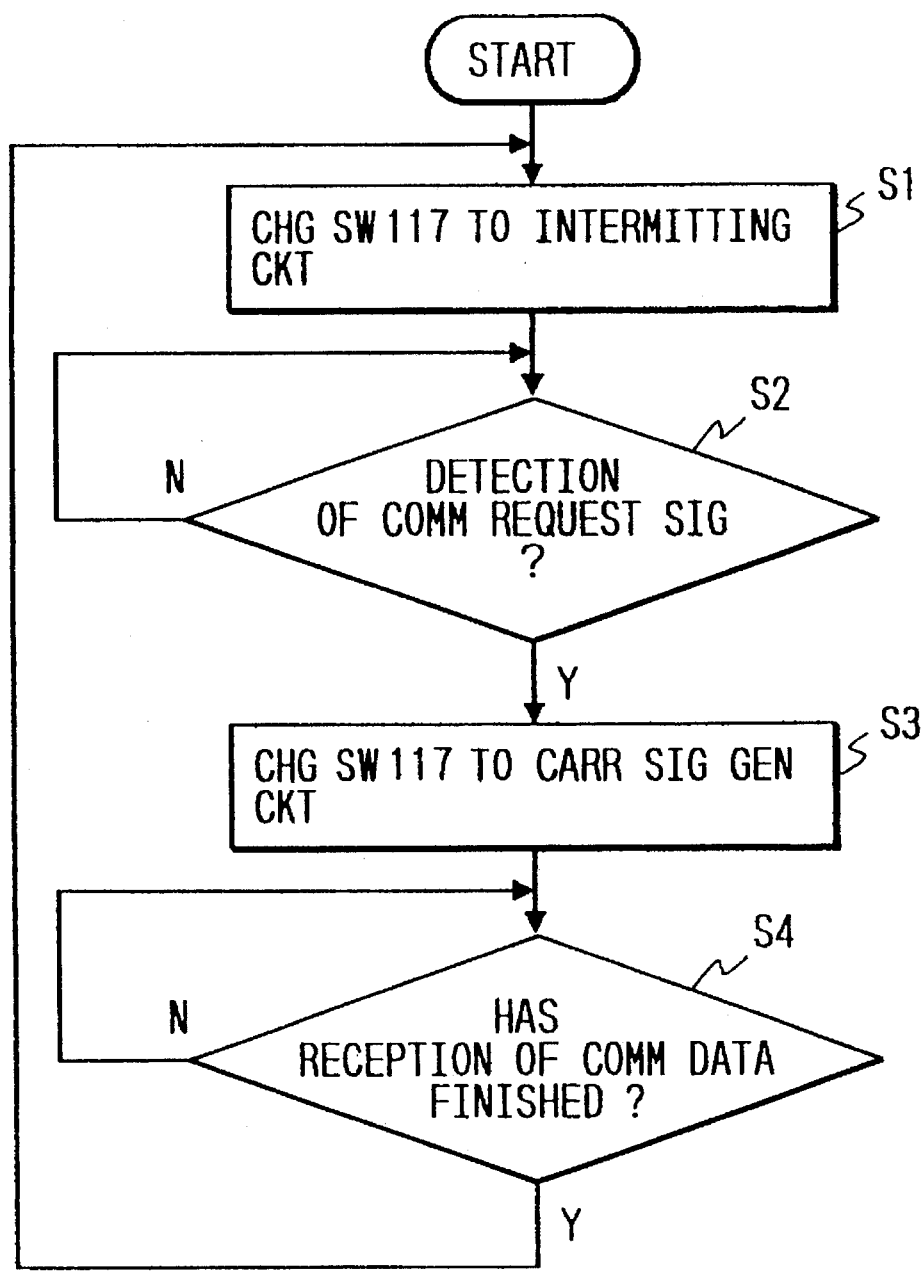
FIG. 25 shows a flow chart of the third embodiment showing an operation of the communication condition judging portion shown in FIG. 11.
Figure 26:
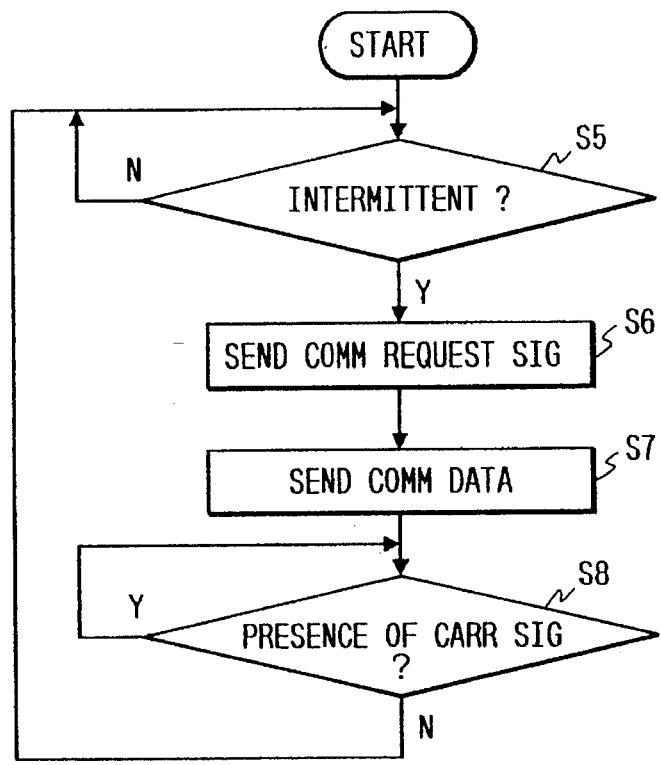
FIG. 26 shows a flow chart of the third embodiment showing an operation of the intermitting judging and control circuit shown in FIG. 11.

FIG. 25 shows a flow chart of the third embodiment showing an operation of the communication condition judging portion 111 shown in FIG. 11. FIG. 26 shows a flow chart of the third embodiment showing an operation of the intermitting judging and control circuit 122 shown in FIG. 11.

The communication condition judging portion 111 comprises a microprocessor and executes a program as shown in the flow chart shown in FIG. 25. At first, the communication condition judging portion 111 changes the switch 117 to the side of the intermitting circuit 116 in step s1. In the following step s2, a decision is made as to whether or not the communication request signal is detected. If the answer is NO, processing loops there to wait the communication request signal. If the answer is YES, the communication condition judging portion 111 changes the switch 117 to the side of the carrier signal generation circuit 115 in step s3. In the following step s4, a decision is made as to whether or not the reception of the communication data has been finished. If the answer is NO, processing loops there and waits the end of the reception of the communication data. If the reception of the communication data has been finished, processing returns to the step s1.

In FIG. 26, the intermitting judging and control circuit 122 makes a decision as to whether or not the received carrier signal has an intermittent portion within a predetermined interval T1 in step s5. If the answer is NO, processing loops there to wait the detection of the intermittent portion. If the answer is YES, the intermitting judging and control circuit 122 sends the communication request signal in step s6. That is, the intermitting judging and control circuit 122 changes the switch 124 to the side of the modulation circuit 125 and operates the memory 126 to read data for the communication request signal in step s6. After a short interval necessary for the interrogator 101 to change the switch 117, the intermitting circuit 122 sends the communication data to the interrogator 101 by reading the communication data from the memory 126 in step s7. In the following step s8, a decision is made as to whether or not the carrier signal is continuously detected for a predetermined interval longer than the intermittent interval. If the answer is YES, the responder 102 remains existing at the service area of the interrogator, so that the communication with the interrogator will not be provided. That is, the responder 102 communicates with the interrogator once the responder enters the service area of the interrogator 101. If the answer is NO, processing returns to step s5 because the responder 102 is considered to exit the service area of the interrogator 101.

Figure 17:
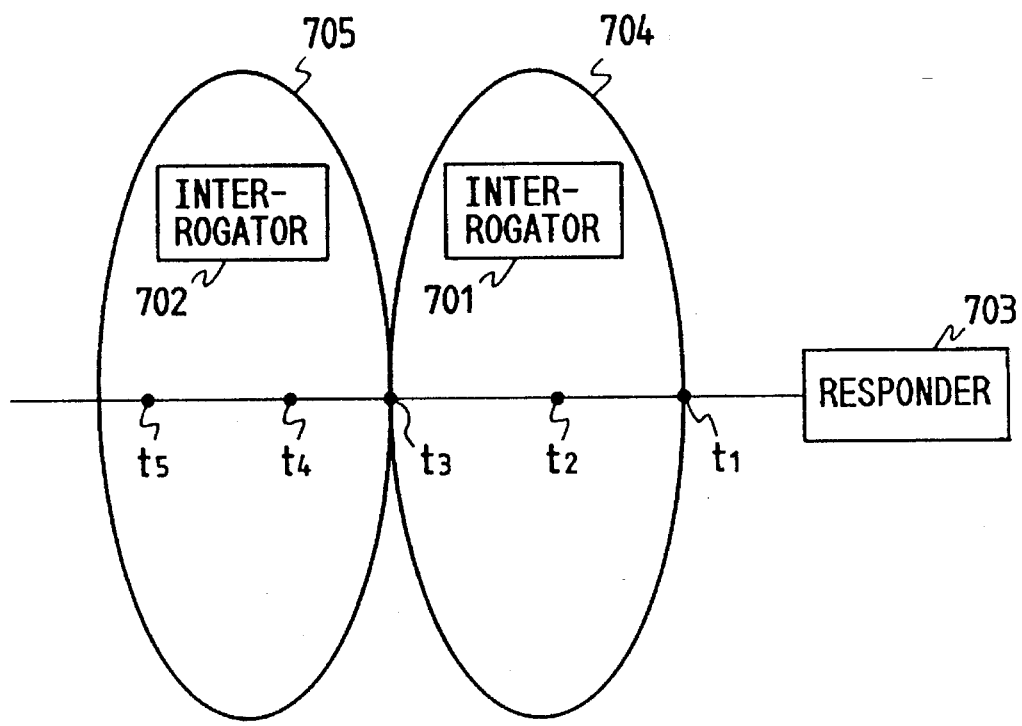
FIG. 17 is an illustration for explaining a fourth embodiment.

FIG. 17 is an illustration for explaining a fourth embodiment.

The circuit structures of the interrogator and the responder of the fourth embodiment is substantially the same as the third embodiment. The difference between the third and fourth embodiments is in the operation of the responder. That is, the intermitting judging and control circuit has a program different from the third embodiment. More specifically, in the third embodiment, the responder 102 communicates with the interrogator 101 once when the responder 102 enters the service area of the interrogator 101 and does not communicate with the interrogator while the responder 102 exists in the service area of the interrogator 101. However, in the fourth embodiment, the responder 703 communicates with an interrogator located adjacent thereto at a predetermined interval. This interval is determined in consideration of a general moving speed of the responder. For example, if the responder is carried by a human, the interval is determined by a general walking speed of the human being.

Figure 18:
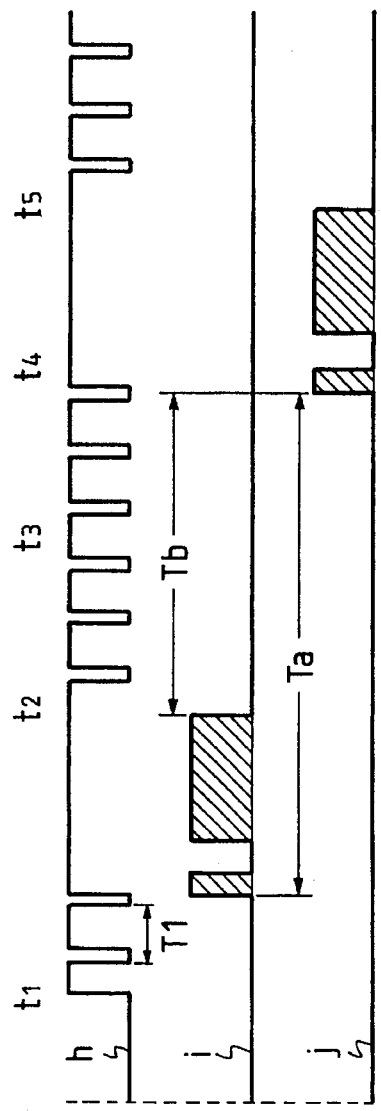
FIG. 18 is a timing chart of the fourth embodiment showing operations of the interrogator and the responders.

FIG. 18 is a timing chart of the fourth embodiment showing operations of the interrogator and the responders.

In FIG. 17. the interrogators 701 and 702 have service areas adjacent to each other as shown. A responder 703 traverses the service areas 704 and 705 successively That is, the responder 703 enters the service area 704 of the interrogator 701 at a timing t1 and is passing through the service area 704. At a timing t3 the responder 703 exits the service area 704 and enters the service area 705 of the interrogator 702 and is passing through the service area 705 at a timing t4 and then at timing t5. In FIG. 18, waveform h shows the carrier signal received by the responder 703, waveform i shows the data received by the interrogator 701, and waveform j shows data received by the interrogator 702.

The responder 703 entered the service area of the interrogator 701 communicates with the interrogator 701 from the timings t1 to t2 and do not perform the reflection modulation for a predetermined interval Tb after the termination of the communication. After the predetermined interval Tb, the responder starts the reception operation of the interrogating signal at the timing t4 at the service area 705 and detects that the intermittently transmitted carrier signal.

Then, the responder 703 starts a communication with the interrogator 702. In other words, the responder 703 periodically effects the communication with the adjacent interrogator with the predetermined interval Ta.

Figure 27:
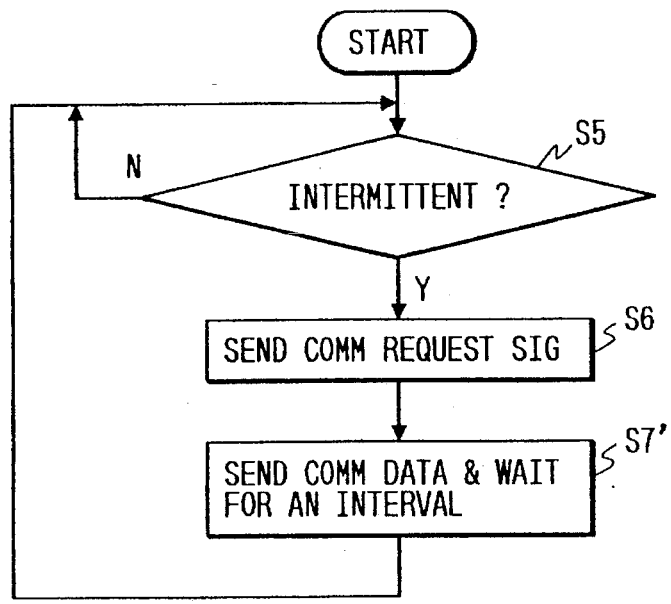
FIG. 27 shows a flow chart of the fourth embodiment showing an operation of the intermitting judging and control circuit shown in FIG. 11.

FIG. 27 shows a flow chart of the fourth embodiment showing an operation of the intermitting judging and control circuit 122 shown in FIG. 11.

In FIG. 27, the intermitting judging and control circuit 122 makes a decision as to whether or not the received carrier signal has an intermittent portion within a predetermined interval T1 in step s5. If the answer is NO, processing loops there to wait the detection of the intermittent portion. If the answer is YES, the intermitting judging and control circuit 122 sends the communication request signal in step s6. That is, the intermitting judging and control circuit 122 changes the switch 124 to the side of the modulation circuit 125 and operates the memory 126 to read data for the communication request signal in step s6. After a short interval necessary For the interrogator 101 changes the switch 117, the intermitting circuit 122 sends the communication data to the interrogator 101 by reading the communication data from the memory 126 and waits for the predetermined interval Tb in step s7'. Then, processing returns to step s5 to detects the intermitting in the carrier signal again.

As mentioned above, the responder of the fourth embodiment can judge whether the interrogator is in the standby mode or communicating by the detection of intermittent interval. Moreover, the responder can perform the communication operation with confirming that the interrogator is communicating with one other responder.

Figure 19:
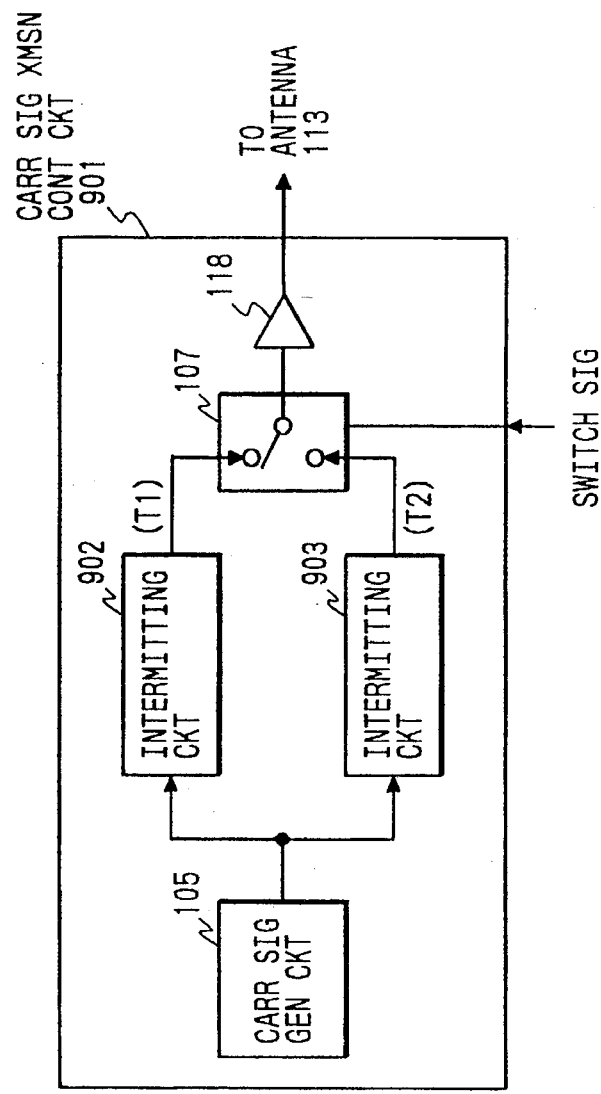
FIG. 19 is a partial block diagram of a fifth embodiment showing a structure of the carrier signal transmission circuit which is substituted for the carrier signal transmission circuit shown in FIG. 11.

FIG. 19 is a partial block diagram of a fifth embodiment showing a structure of the carrier signal transmission circuit 901 which is substituted for the carrier signal transmission circuit 110 shown in FIG. 11.

The carrier signal transmission control circuit 901 comprises the carrier signal generation circuit 105; an intermitting circuit 902 for intermittently transferring the carrier signal (first intermittent carrier signal) to the switch 107, i.e., transferring the carrier signal for a first predetermined duration at a regular interval T1 longer than the first predetermined duration; an intermitting circuit 903 for intermittently transferring the carrier signal (second intermittent carrier signal) to the switch 107, i.e., transferring the carrier signal For a second predetermined duration at a regular interval T2 longer than the second predetermined duration; and a switch 107 for outputting an output of the intermitting circuit 902 or an output of the intermitting circuit 903 in accordance with the switching signal from the communication judging circuit portion 111; and the power amplifier 118 for supplying the output of the switch 107 to the antenna 113 with amplification. The communication condition judging portion 111 operates the switch 107 to transfer the first intermittent carrier signal in the condition that the interrogator is in a standby mode. That is, the communication condition judging portion 111 operates the switch 107 to transmit the carrier signal having intermittent portion having the interval T1. The intermitting judging circuit 122 of the responder makes a judgment of the standby mode of the interrogator by checking whether or not the intermittent interval is T1. If the intermittent interval is T1, the responder judges that the interrogator is in the standby mode. Then, the responder starts the communication with the interrogator. That is, the responder transmits the communication requesting signal toward the interrogator. The interrogator receiving the communication request signal transmits tile carrier signal with intermittent portions at a regular interval T2. The responder detects that the intermittent period changes from T1 to T2 and performs the reflection modulating. The communication is effected by that the interrogator receives and demodulates the communication data.

Figure 20:
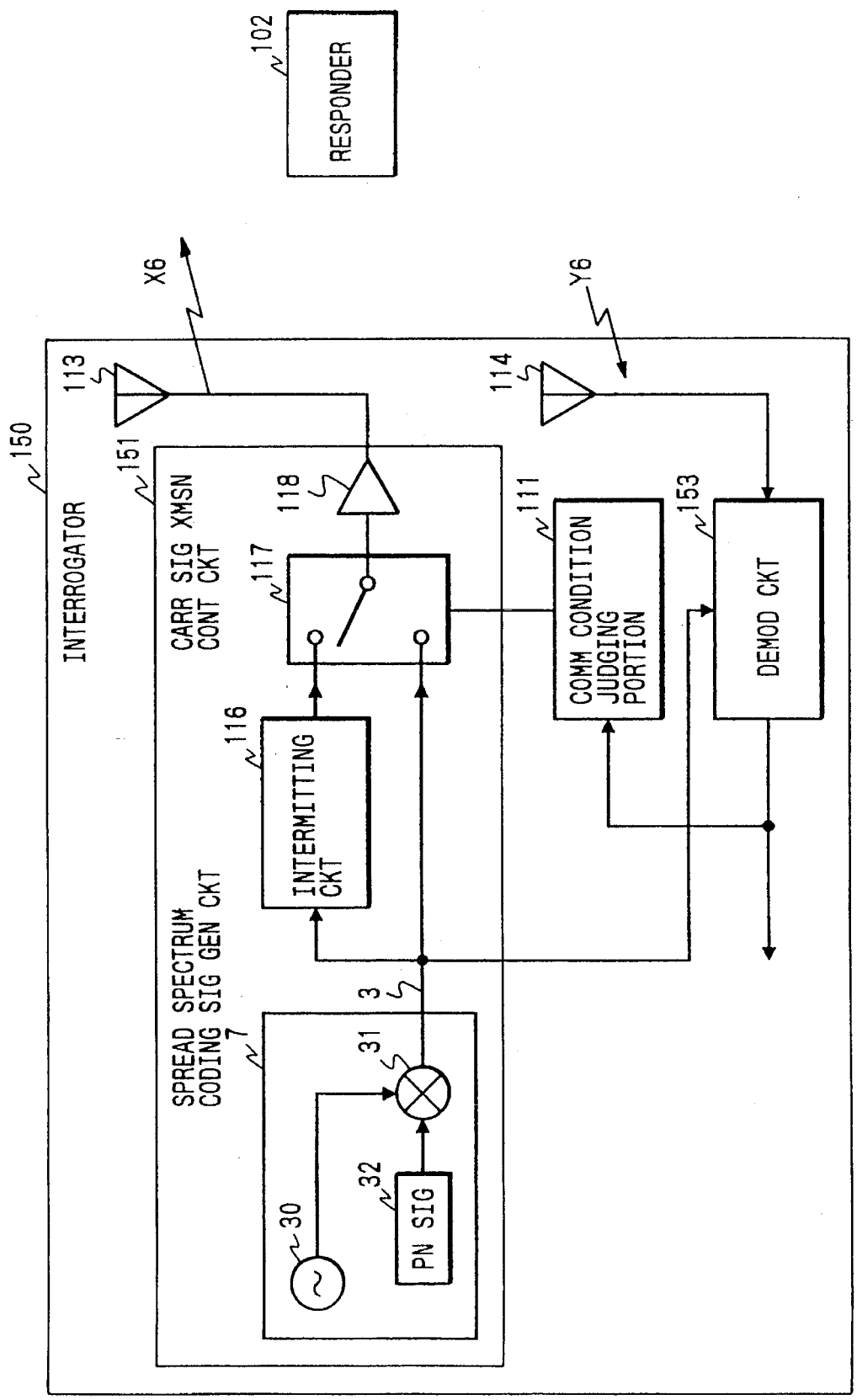
FIG. 20 is a block diagram of a sixth embodiment of an interrogator.

FIG. 20 is a block diagram of a sixth embodiment of an interrogator. The interrogator 150 of the sixth embodiment is substantially the same as the interrogator 101 of the third embodiment. The difference between the third and this sixth embodiments is as follows:

The interrogator 150 comprises the spread spectrum coded signal generation circuit 7 shown in FIG. 1 in place of the carrier signal generation circuit 115 shown in FIG. 11. The spread spectrum coded signal generating circuit 7 spread-spectrum-modulates the carrier signal with a pseud noise signal (PN signal) which is selected from plural types of pseud noise signals generated in the spread spectrum coded signal generating circuit 7. However, a selection circuit for selecting the pseud noise from plural types of pseud noise signals is omitted here. More specifically, in the spread spectrum coded signal generating circuit 7, the pseudo noise generation circuit 32 generates one of plural types of pseudo noise signals, the oscillator 30 generates tile high frequency signal as the carrier signal, and the mixer 31 mixes the carrier signal with the pseudo noise signal to generate the spread spectrum coded signal. The spread spread spectrum coded signal from the spread spectrum coded signal generation circuit 7 is supplied to the switch 117. The switch 117 supplies the spread spectrum coded signal to the antenna 113 through the power amplifier 118. The spread spectrum coded signal is also supplied to the intermitting circuit 116. The switching signal form the communication condition judging portion 111 is similar to the first embodiment. That is, at first, the switching signal is so generated that the switch 117 transfers the output of the intermitting circuit 116 and then, when the communication condition judging portion 111 detects a communication requesting signal, the switching signal is so generated that the switch 117 transfers the spread spectrum coded signal 3.

The antenna 113 transmits the spread spectrum coded signal or the intermittent spread spectrum coded signal as the interrogating signal X6 which is also supplied to a mixer (not shown) in the demodulation circuit 153. If the responder 102 exists in or enters a service area of the interrogator 101, the receiving and reflection antenna 123 of the responder 102 receives the interrogating signal X6. The modulation circuit 125 modulates the received interrogating signal X6 with modulation data read from the memory 126 by changing the impedance condition of the antenna 123. That is, the modulated interrogating signal X6 is reflected by the antenna 123 with data from the memory 126 as the responding signal Y6.

In the interrogator 150, the receiving antenna 114 receives the responding signal Y6. The received responding signal Y6 is mixed with the spread spectrum coded signal from the spread spectrum coded signal generation circuit 7 via the switch 117 to demodulate the received responding signal Y6 by the demodulating circuit 153 to supply the output demodulated data corresponding to the data read from the memory 126 of the responder 123.

Here, generally, in the mobile unit identification system, a propagation distance, that is a radii of the service area is assumed as several meters which is relatively short. Therefore, a phase difference between the spread coded signal and the received responding signal Y6 is of the order of $10^{-8}$ seconds and is negligible, so that in the interrogator 150, the responding signal Y6 received by the receiving antenna 114 is directly mixed with the spread spectrum coded signal by the mixer included in the demodulation portion 153 to demodulate the responding signal Y6.

This demodulated data provides identification of the responder 123 because the carrier signal is modulated with a predetermined pseudo noise signal as the interrogating signal X6 which is different from interrogating signals from other interrogators. That is, the responding signal generated from the interrogating signal from the another interrogator has no correlation with the spread spectrum coded signal generated by this interrogator 150, so that this responding signal cannot be demodulated but only the responding signal derived from the spread spectrum coded signal generated by this interrogator 150 is demodulated. Therefore, the spread spectrum coded signal generation circuit 7 provides the surer identification of the responder 123 in the service area.

Figure 21:
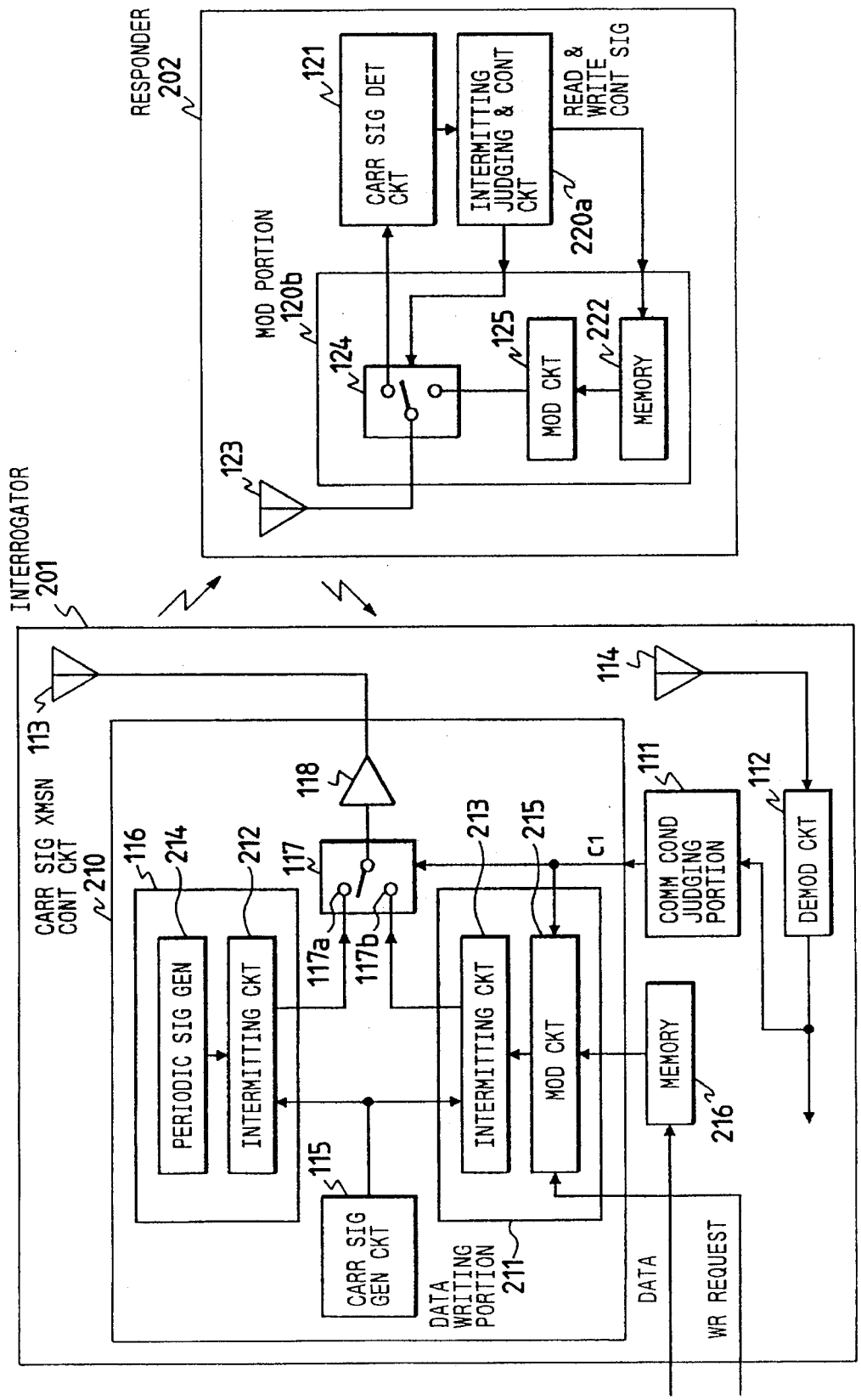
FIG. 21 is a block diagram of a seventh embodiment.

FIG. 21 is a block diagram of a seventh embodiment.

The interrogator and the responder of the seventh embodiment is similar to the third embodiment. That is, in the standby mode of the interrogator, the interrogator 201 transmits the carrier signal intermittently at the regular interval T1.

The differences between the third and the seventh embodiment are as follows:

In the interrogator, the carrier signal from the carrier signal generation circuit 115 is not directly supplied to the switch 117 but supplied to a data writing portion 211. The data writing portion 211 comprises an intermitting circuit 213 and a modulation circuit 215. The modulation circuit 215 controls the intermitting circuit 213 for intermittently transferring the carrier signal to the switch 117 in accordance with data from memory 216 in response to a write request signal in the presence of the switching control signal c1 from the communication condition judging portion 111 which operates in the similar manner to the third embodiment as shown in FIG. 25 and for continuously transferring the carrier signal to the switch 117 in the absence of the write request signal in the presence of the switching control signal c1. The modulation circuit 215 modulates the carrier signal with the data from the memory 216 by intermittently transferring the carrier signal in the presence of the write request signal in the presence of the switching control signal c1 such that the output thereof does not shows the same interval as the interval T1. In the responder 202, the intermitting judging and control circuit 220a operates differently.

Figure 28:
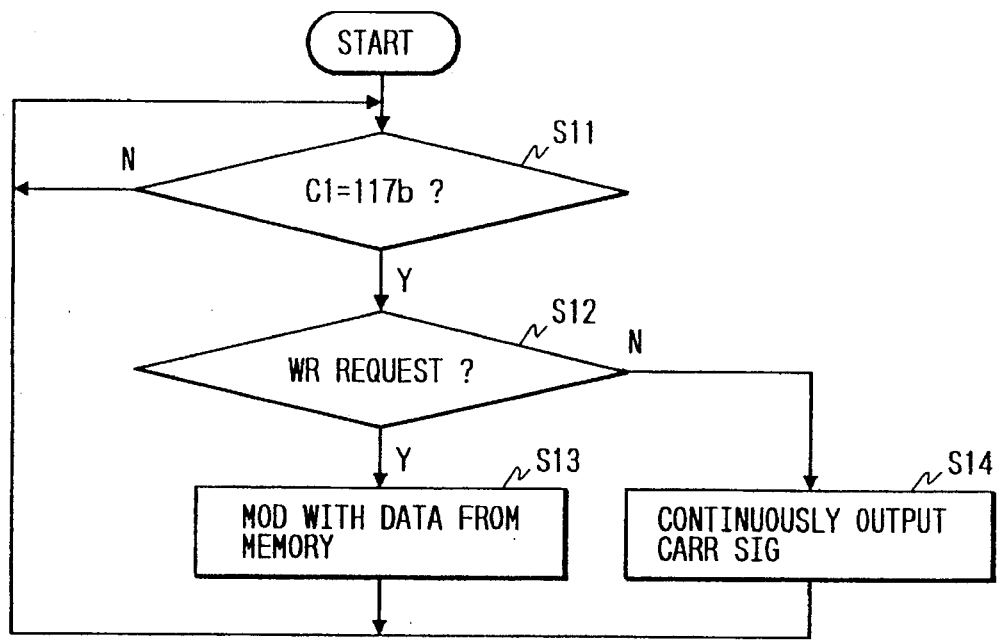
FIG. 28 shows a flow chart of the seventh embodiment showing an operation of the modulation circuit.

FIG. 28 shows a flow chart of tile seventh embodiment showing an operation of the modulation circuit 215.

At first, the modulation circuit 215 makes a decision as to whether or not the switching control signal c1 from the communication condition judging portion 111 which is similar to the third embodiment indicates the contact points 117b side. If the answer is NO, processing loops there. If the answer is YES, a decision is made as to whether or not there is a write request signal. If there is the write request signal, the modulation circuit 215 modulates the carrier signal by the intermitting circuit 213 by intermitting the carrier signal such that the output of the intermitting circuit 213 does not include interruption of the carrier signal for the interval T1 in step s13. If the answer is NO, the modulation circuit 215 operates the intermitting circuit 213 to output the carrier signal continuously in step s14.

Figure 29:
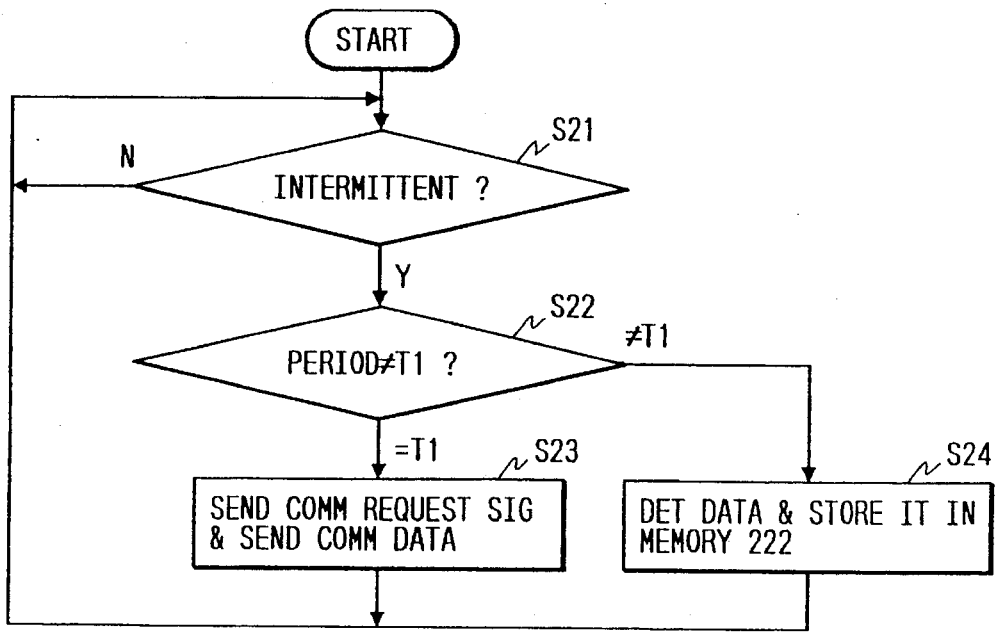
FIG. 29 shows a flow chart of the seventh embodiment showing an operation of the intermitting judging and control circuit.

FIG. 29 shows a flow chart of the seventh embodiment showing an operation of the intermitting judging and control circuit. On the other hand, in the responder 202, the intermitting judging and control circuit 220a operates in accordance with the flow chart shown in FIG. 29.

In step s21, the intermitting judging and control circuit 220a makes a judgement whether or not the detected carrier signal has intermittent portions. If the answer is NO, the interrogator communicates with another responder, so that the responder waits. If the answer is YES, in the following step s22, a decision is made as to whether or not the intermittent period is not T1. If the period is T1, the intermitting judging and control circuit 220a operates the memory 222 to sends the communication request signal and then, send communication data in step s23. If the period is not T1, the intermitting judging and control circuit 220a detects the data and operates the memory to store the detected data in step s24.

The modulation circuit 215 may send a mode change code before sending the data in the similar manner to the first embodiment.

Figure 22:
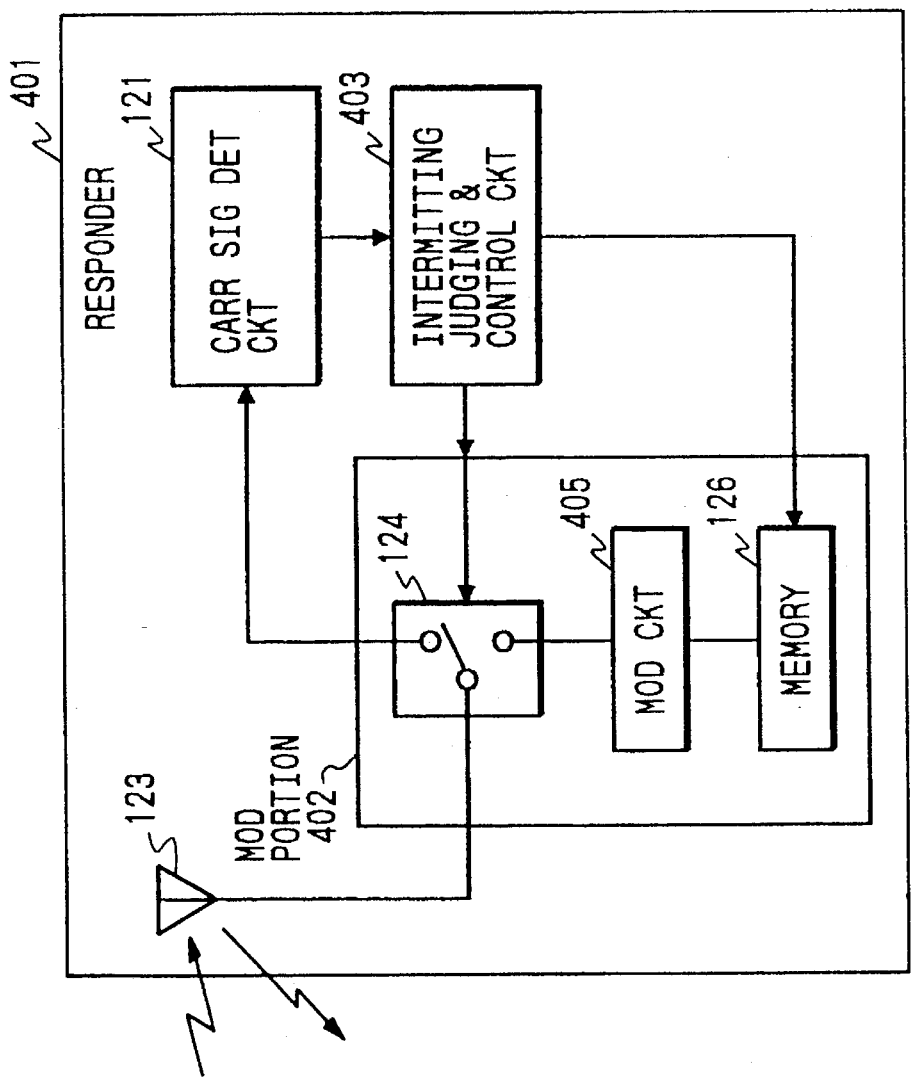
FIG. 22 is a block diagram of an eighth embodiment showing interrogators and a responder.
Figure 22:
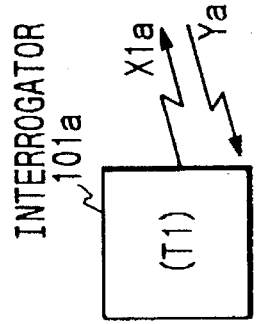
Figure 22:
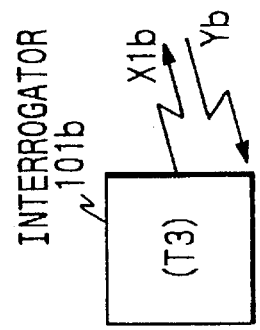
Figure 23:
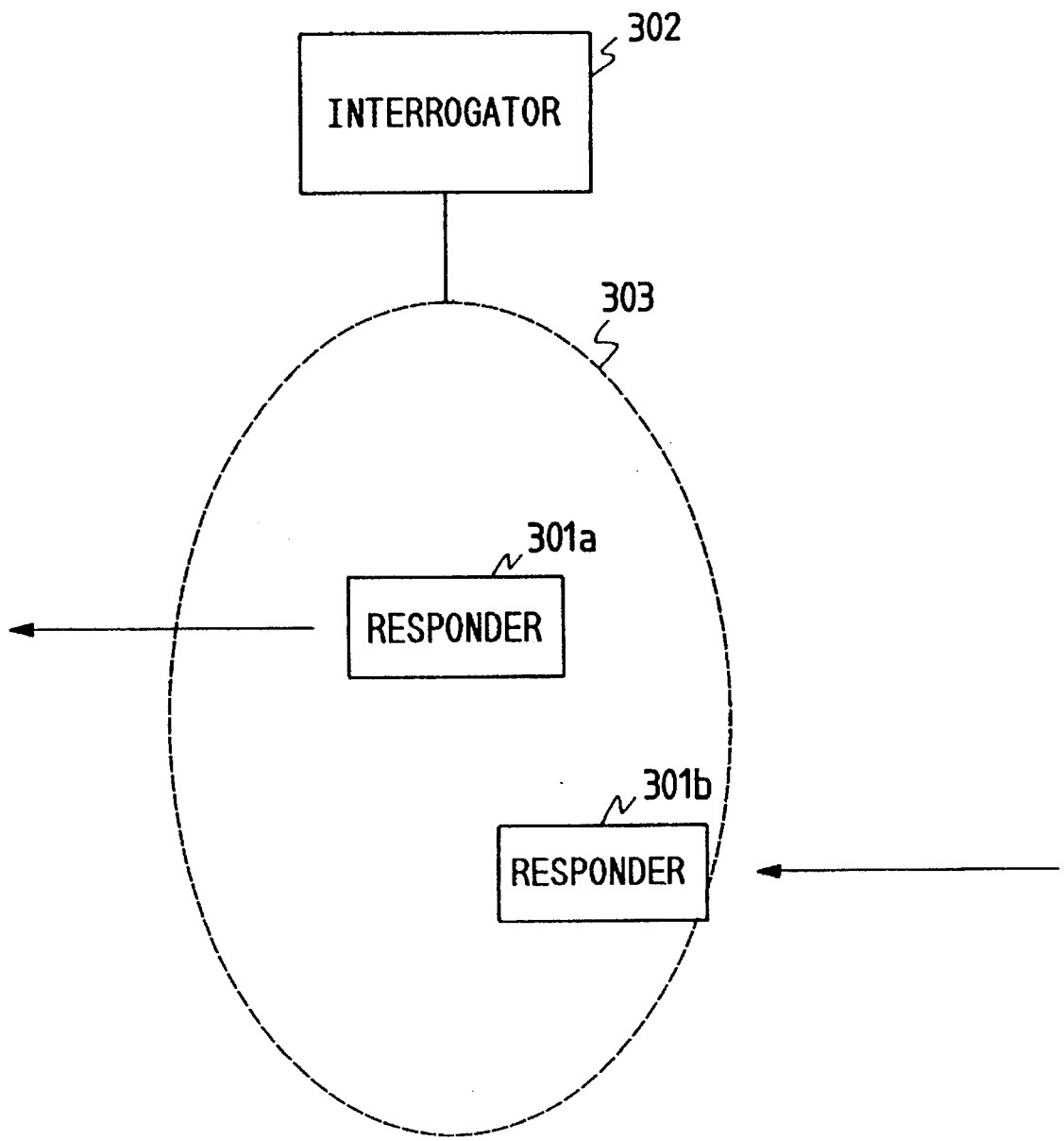
FIG. 23 is an illustration showing a condition of the second prior art mobile unit identification system.
Figure 24:
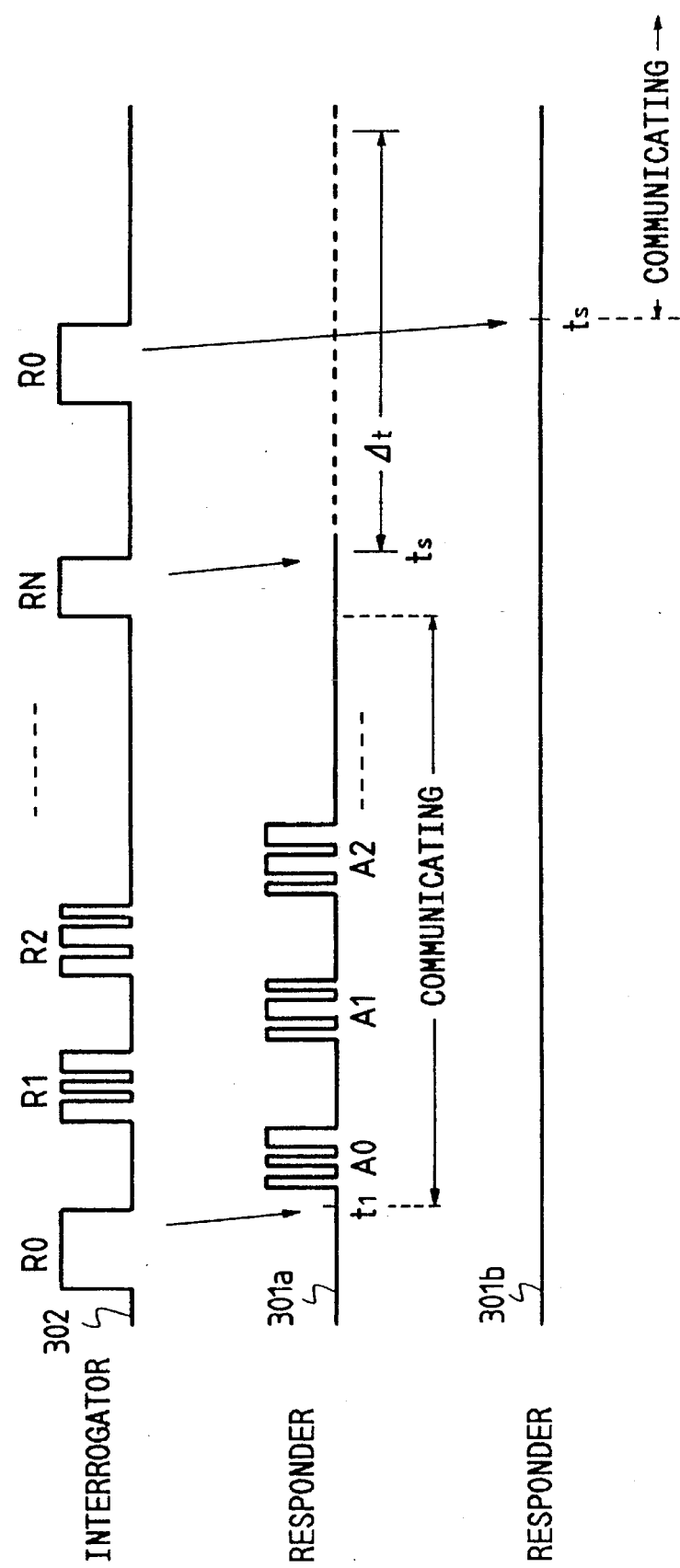
FIG. 24. shows a timing chart of the second prior art mobile unit identification system.

FIG. 22 is a block diagram of an eighth embodiment showing interrogators 101a and 101b and a responder 401. The basic structure of the responder is the same as the third embodiment. The differences are as follows:

The interrogator 101a is the same as the interrogator of the third embodiment, that is, transmits the carrier signal with the intermittent period T1 in the standby mode. On the other hand, the interrogator 101b has the same structure but, in the standby mode, it transmits the carrier signal with an intermittent period T3 different From the intermittent period T1. In this embodiment, it is assumed that there are A group of interrogators which transmit the carrier signal with the intermittent period T1 and B group of interrogators transmit the carrier signal with the intermittent period T3.

Figure 30:
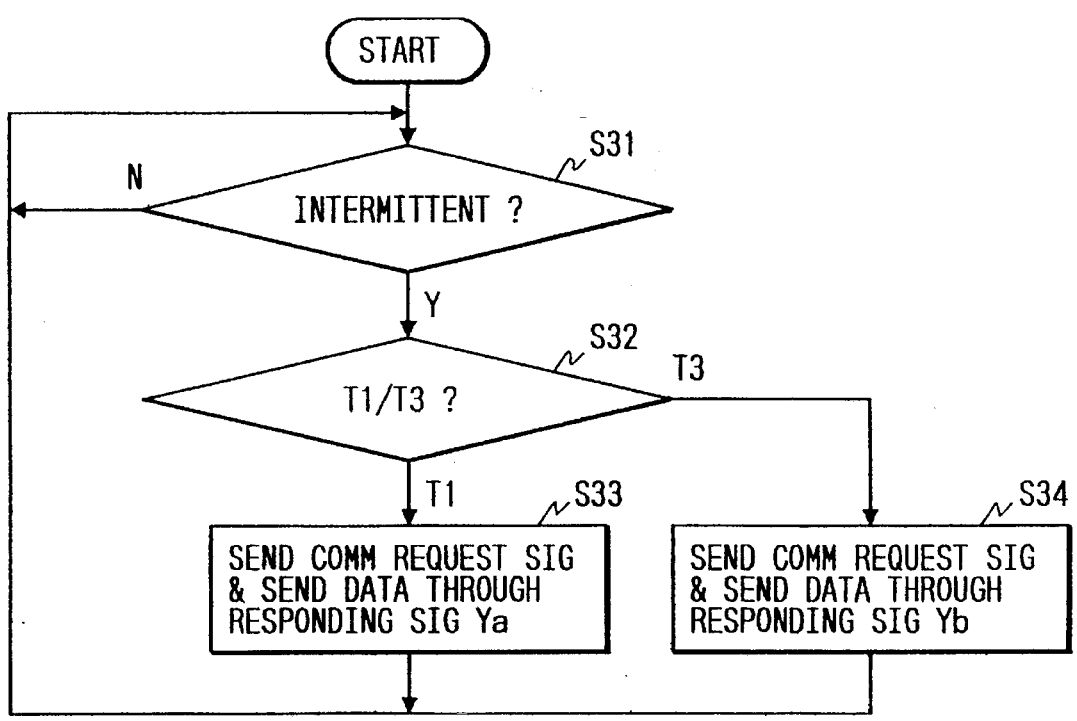
FIG. 30 shows a flow chart of the eighth embodiment showing an operation of the intermitting judging and control circuit.

In the responder 401, an intermitting judging and control circuit 403 operates differently from the third embodiment. The difference is as follows:

FIG. 30 shows a Flow chart of the eighth embodiment showing an operation of the intermitting judging and control circuit 403.

At first, a decision is made as to whether or not the detected carrier signal has intermittent periods. If the answer is NO, processing loops there because the interrogator is in communication condition. If the answer is NO, a decision is made as to whether the intermittent period is T1 or T3. If the intermittent period is T1, the intermitting judging and control circuit 403 sends a first communication request signal including a first code and then communication data through a responding signal Ya. If the intermittent period is T3, the intermitting judging and control circuit 403 sends a communication request signal including a second code and then communication data through a responding signal Yb. The interrogators 101a and 101b can distinguish between the first code and second codes.

Therefore, if there are two kinds of interrogators at the same area, the responder 401 can communicate with the interrogators separately.

What is claimed is:

1. A mobile unit identifying system comprising:

(a) an interrogator having:
spread spectrum signal generation means for generating a spread spectrum coded signal using a predetermined pseudo noise signal;
modulation means for amplitude-modulating said spread spectrum coded signal in accordance with first data;
transmission means for transmitting either said spread spectrum coded signal from said spread spectrum signal generator in a first mode or said amplitude modulated spread spectrum coded signal from said modulation means in a second mode;
receiving means for receiving a responding signal;
demodulation means for demodulating said responding signal including a communication request signal and data with said spread spectrum coding signal from said spread spectrum signal generation means in said first mode;
first detection means for detecting said communication request signal from said demodulation means; and
first control means responsive to said detected communication request signal for operating said modulation means and transmission means in said second mode and for operating said transmission means in said first mode before said detection means detects said communication request signal; and (b) a responder having;
antenna means for receiving said spread spectrum coded signal from said transmission means in a third mode and for transmitting said responding signal with modulation of said spread spectrum signal from said transmission means through reflecting and absorbing said transmitted spread coded signal in a fourth mode;
second detection means for detecting said spread spectrum coded signal from said antenna means in said third mode;
comparing means responsive to said second detection means for detecting whether or not an amplitude of said detected spread spectrum coded signal exceeds predetermined value;
storing means for storing second data;
second control means responsive to said comparing means for generating said communication requesting signal when the amplitude of said received spread spectrum coded signal exceeds the predetermined value, for transmitting said communication request signal by operating said antenna means in said fourth mode; and
third control means responsive to said second control means for operating said antenna means, second detection means and comparing means for receiving said spread spectrum coded signal amplitude modulated with said first data in said third mode, and for detecting said received first data and storing said first data in said storing means as said second data.

2. A mobile unit identifying system as claimed in claim 1, further comprising fourth control means responsive to said comparing means and said third control means for reading said second data and for operating said antenna means in said fourth mode in accordance with said second data.

3. A mobile unit identifying system as claimed in claim 1, further comprising power supply means for receiving a supply power from an output of said second detection means and supplying said supply power to said responder.

4. A method of modulating for a mobile unit identification system having an interrogator for transmitting predetermined electromagnetic waves and receiving reflected said predetermined electromagnetic waves and a responder, having storing means storing first data, for transmitting first data, for transmitting first data by reflecting said electromagnetic waves with modulation by said first data, comprising the steps of:

(a) transmitting said predetermined electromagnetic waves from said interrogator to said responder in a first mode;

(b) reading said first data from said storing means and transmitting said first data from said responder by reflecting said electromagnetic waves with modulation by said first data in said first mode;

(c) receiving and detecting said transmitted first data by said interrogator in said first mode;

(d) modulating said predetermined electromagnetic waves with second data in second mode in response to step (c);

(e) transmitting said predetermined electromagnetic waves modulated with said second data to said responder in said second mode from said interrogator;

(f) receiving said predetermined electromagnetic waves by said responder in said second mode; and (g) detecting said second data in said second mode by said responder.

5. A method of modulating for a mobile unit identification system as claimed in claim 4, further comprising the step of:

(h) storing said detected second data in said storing means.

6. A method of modulating for a mobile unit identification system as claimed in claim 4, further comprising the step of:

producing a spread spectrum coded signal for transmitting said predetermined electromagnetic waves, said first data being detected using said spread spectrum coded signal in step (c).

7. A method of modulating for a mobile unit identification system as claimed in claim 4, further comprising the steps of:

producing a first end code signal by said responder;

producing a second end code signal by said interrogator;

transmitting said first end code signal from said responder by reflecting said electromagnetic waves with modulation by said first end code signal in said first mode after step (b); and transmitting said second end code signal through said predetermined electromagnetic waves from said interrogator to said responder in said second mode after step (e).

8. A method of modulating for a mobile unit identification system as claimed in claim 4, further comprising the steps of:

(h) receiving and detecting said predetermined electromagnetic waves from said interrogator in said first mode by said responder;

(i) producing a voltage signal from said predetermined electromagnetic waves detected in step (h);

(j) comparing said voltage signal with a reference voltage; and (k) changing a condition of said responder in accordance with the result obtained in step (i).

9. A method of modulating for a mobile unit identification system as claimed in claim 8, further comprising the steps of:

(l) judging whether or not said responder enters a service area of said interrogator where a magnitude of said transmitted electromagnetic waves is more than a predetermined value using said result obtained in step (j);

(m) receiving said predetermined electromagnetic waves by said responder when it is judged that said responder does not enter said service area of said interrogator in a detection condition of said responder;

(n) changing a condition of said responder to a modulation condition and executing steps (b) to (c) when it is judged that said responder enters said service area of said interrogator in step (1);

(o) after step (n), changing said responder to said detection condition;

(p) judging whether or not said first data has been received in step (c); and (q) when said first data has been received in step (p), executing steps (d) to (f) and executing step (g) by steps (h) to (j).

10. A method of modulating for a mobile unit identification system as claimed in claim 4, further comprising the step of:

after step (g), changing operation of said responder to said first mode.

11. A method of modulating for a mobile unit identification system as claimed in claim 4, further comprising the steps of:

(h) judging a condition of said responder by detecting whether or not said transmitted first data has been received and detected during step (c) and by detecting whether or not said second data has been transmitted during step (e); and (i) changing the mode between said first and second mode in accordance with the results of step (h).

* * * * *